United States Patent
Izumihara et al.

(10) Patent No.: US 9,432,532 B2
(45) Date of Patent: Aug. 30, 2016

(54) INFORMATION PROCESSING APPARATUS, INFORMATION PROCESSING METHOD, AND MEDIUM USING AN ACTION STATE OF A USER

(71) Applicant: SONY CORPORATION, Tokyo (JP)

(72) Inventors: Atsushi Izumihara, Kanagawa (JP); Takuo Ikeda, Tokyo (JP); Tetsuo Ikeda, Tokyo (JP); Kentaro Kimura, Tokyo (JP); Yasuyuki Koga, Kanagawa (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/521,007

(22) Filed: Oct. 22, 2014

(65) Prior Publication Data

US 2015/0124111 A1 May 7, 2015

(30) Foreign Application Priority Data

Nov. 1, 2013 (JP) ................. 2013-228074

(51) Int. Cl.
H04N 5/232 (2006.01)
H04N 1/00 (2006.01)
G06K 9/00 (2006.01)

(52) U.S. Cl.
CPC ...... *H04N 1/00392* (2013.01); *G06K 9/00335* (2013.01); *H04N 1/00214* (2013.01); *H04N 5/232* (2013.01)

(58) Field of Classification Search
CPC ..................... H04N 1/00381; H04N 1/00352; H04N 1/00392; H04N 1/00214; H04N 5/232; H04N 5/23203; H04N 5/23258; G06K 9/00335; G06K 9/00342; G06K 9/00348; G06K 9/00355
See application file for complete search history.

(56) References Cited

U.S. PATENT DOCUMENTS

| 7,593,026 B2* | 9/2009 | Turner | G09B 9/307 345/3.1 |
| 7,917,020 B2* | 3/2011 | Murata | H04N 5/772 348/231.3 |
| 9,001,155 B2* | 4/2015 | Tamaru | G02B 27/01 345/633 |
| 2006/0256140 A1* | 11/2006 | Turner | G09B 9/307 345/690 |
| 2006/0291840 A1* | 12/2006 | Murata | H04N 5/772 396/50 |
| 2013/0127980 A1* | 5/2013 | Haddick | G06F 3/013 348/14.08 |
| 2013/0241955 A1* | 9/2013 | Tamaru | G02B 27/01 345/633 |
| 2013/0335301 A1* | 12/2013 | Wong | G02B 27/0093 345/8 |
| 2014/0176722 A1* | 6/2014 | Sashida | H04N 5/2259 348/158 |

FOREIGN PATENT DOCUMENTS

JP 4289326 B2 7/2009

* cited by examiner

*Primary Examiner* — Nicholas Giles
(74) *Attorney, Agent, or Firm* — Chip Law Group

(57) ABSTRACT

There is provided an information processing apparatus including an action recognition unit configured to recognize an action state of a user based on a measurement result obtained by a sensor carried by the user, an image processing unit configured to perform a process regarding an amount of information on an image photographed by a photographing unit based on an action state of the user recognized by the action recognition unit during photographing by the photographing unit carried by the user, and a transmission control unit configured to cause the image processed by the image processing unit to be transmitted to an image processing device used to perform image recognition.

11 Claims, 18 Drawing Sheets

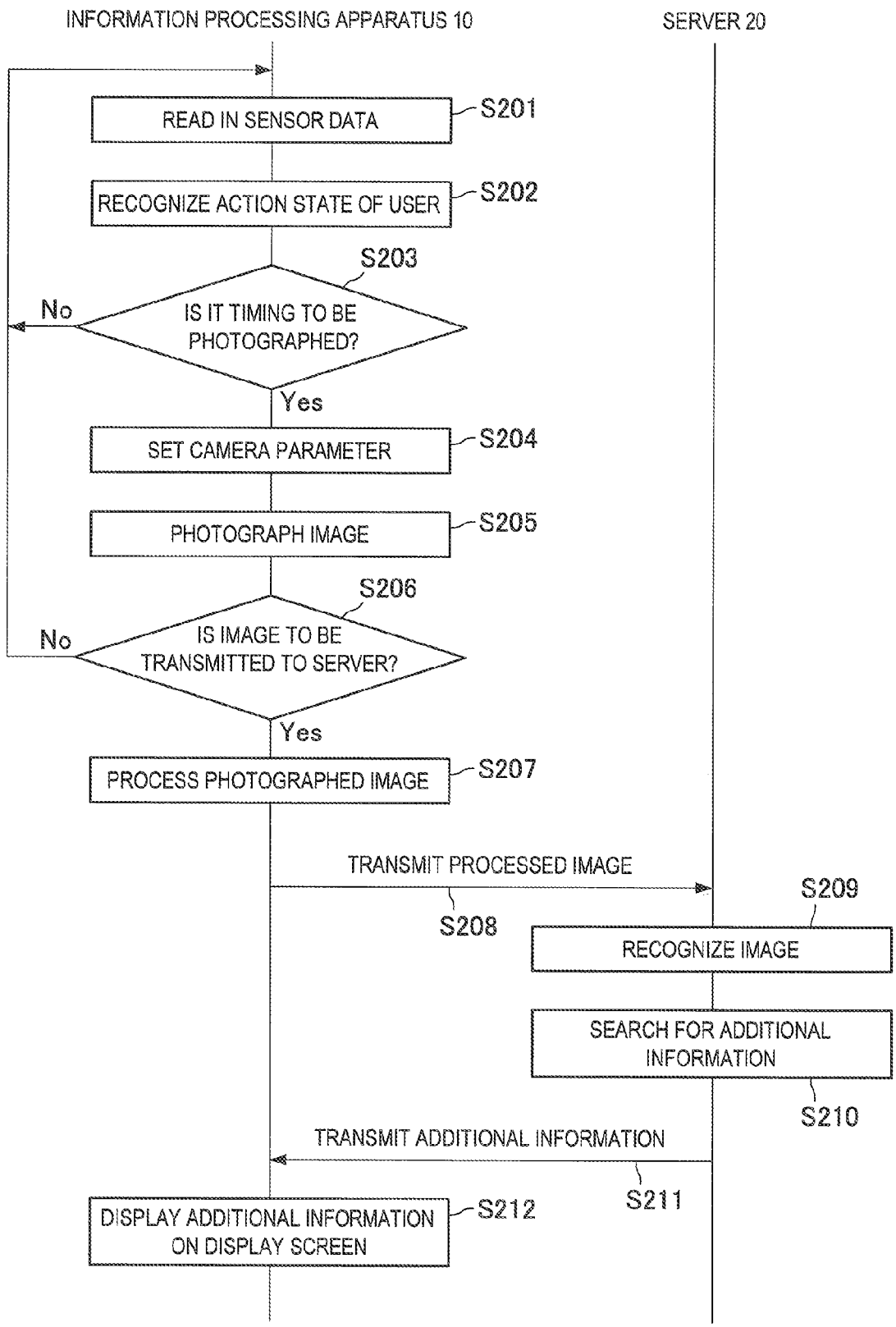

INFORMATION PROCESSING APPARATUS, INFORMATION PROCESSING METHOD, AND MEDIUM USING AN ACTION STATE OF A USER

CROSS REFERENCE TO RELATED APPLICATIONS

This application claims the benefit of Japanese Priority Patent Application JP 2013-228074 filed Nov. 1, 2013, the entire contents of which are incorporated herein by reference.

BACKGROUND

The present disclosure relates to an information processing apparatus, an information processing method, and a program.

In recent years, various types of devices, such as digital cameras and smartphones, which are equipped with various sensors including gyroscopes as well as image sensors have been developed.

As an example, JP 4289326B discloses a technology that recognizes an action of a user holding a camcorder based on sensor data obtained by a sensor that is built in the camcorder in the same timing as that of photographing by the camcorder, and records the recognized result of action in association with the photographed image.

SUMMARY

However, if it is assumed that the above-mentioned technology is applied to a case of transmitting the photographed image to an external device, the above-mentioned technology may be unable to reduce adaptively the communication traffic. For example, with the above-mentioned technology, an image to be transmitted to an external device may be difficult to be optionally selected. Thus, all of the images are necessary to be transmitted, and when there are a large number of photographed images, the communication traffic will be increased. In addition, with the above-mentioned technology, although the amount of information of the photographed image can be reduced, the uniform reduction in the amount of information for all of the images may be difficult. Thus, an undesirable situation for the user occurs such as when even the resolution of an image region regarding an object that is watched by the user during photographing is reduced.

Therefore, according to an embodiment of the present disclosure, there is provided a novel and improved information processing apparatus, information processing method, and program, capable of reducing adaptively the communication traffic in case of transmitting a photographed image to an external device.

According to an embodiment of the present disclosure, there is provided an information processing apparatus including an action recognition unit configured to recognize an action state of a user based on a measurement result obtained by a sensor carried by the user, an image processing unit configured to perform a process regarding an amount of information on an image photographed by a photographing unit based on an action state of the user recognized by the action recognition unit during photographing by the photographing unit carried by the user, and a transmission control unit configured to cause the image processed by the image processing unit to be transmitted to an image processing device used to perform image recognition.

According to another embodiment of the present disclosure, there is provided an information processing method including recognizing an action state of a user based on a measurement result obtained by a sensor carried by the user, performing, by a processor, a process regarding an amount of information on an image photographed by a photographing unit based on an action state of the user recognized during photographing by the photographing unit carried by the user, and causing the processed image to be transmitted to an image processing device used to perform image recognition.

According to another embodiment of the present disclosure, there is provided a program for causing a computer to function as an action recognition unit configured to recognize an action state of a user based on a measurement result obtained by a sensor carried by the user, an image processing unit configured to perform a process regarding an amount of information on an image photographed by a photographing unit based on an action state of the user recognized by the action recognition unit during photographing by the photographing unit carried by the user, and a transmission control unit configured to cause the image processed by the image processing unit to be transmitted to an image processing device used to perform image recognition.

According to one or more of embodiments of the present disclosure described above, it is possible to reduce adaptively the communication traffic in case of transmitting a photographed image to an external device. Note that the advantages described here are not necessarily limited, or any other advantages described herein and other advantages understood from the present disclosure may be achievable.

BRIEF DESCRIPTION OF THE DRAWINGS

FIG. 24 is a sequence diagram illustrating operation according to the second embodiment.

DETAILED DESCRIPTION OF THE EMBODIMENT(S)

Figure 1:
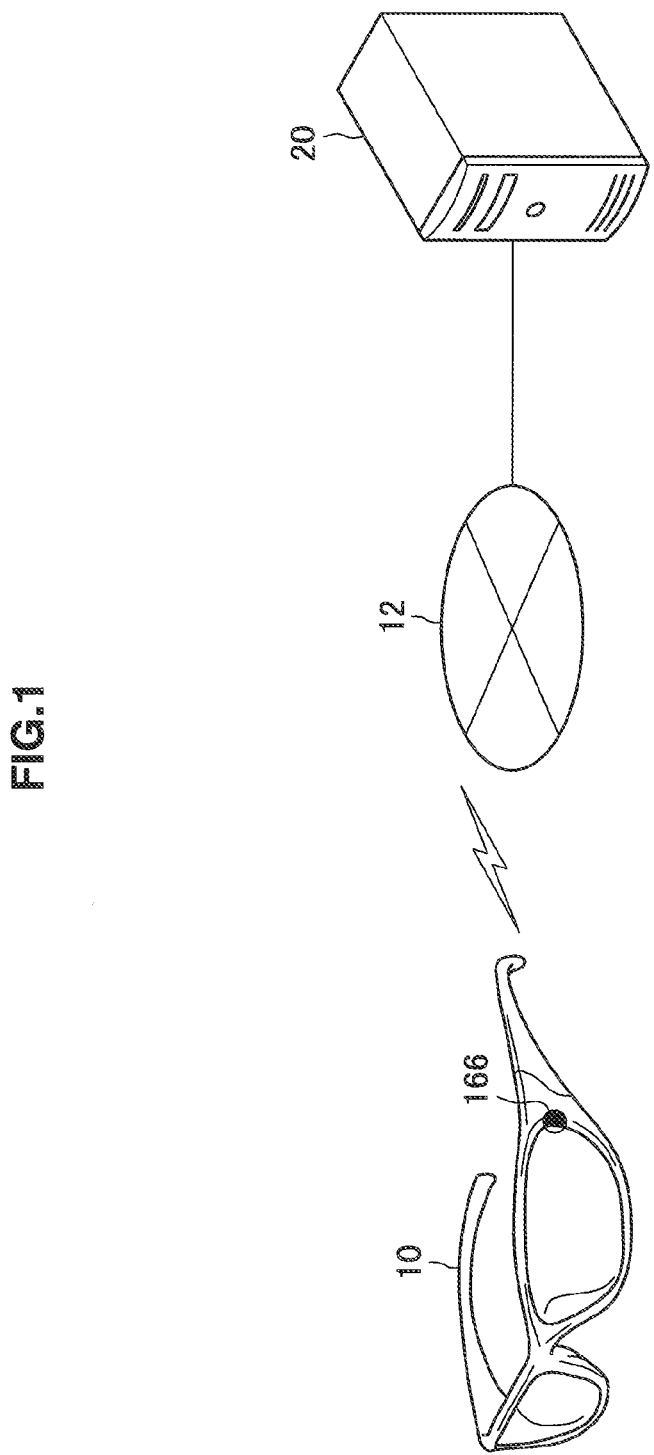
FIG. 1 is a diagram for describing the basic configuration of an information processing system that is common to each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "embodiments for implementing the present disclosure" will be described in the following order of items.

1. Background
2. Basic Configuration of Information Processing System
3. Detailed Description of each Embodiment
3-1. First Embodiment
3-2. Second Embodiment
4. Modification <<1. Background>>

The present disclosure may be implemented in various embodiments, as described in detail in the items "3-1. First Embodiment" and "3-2. Second Embodiment" and their subcategories, as an example. To clearly illustrate features of embodiments of the present disclosure, the technical background that led to the conception of an information processing apparatus according to an embodiment of the present disclosure is first described.

The development of wearable devices, which have a built-in image sensor and are used by being mounted constantly on the user, has been recently studied. Such a wearable device is likely to be able to recognize constantly an object, a person, or the like contained in an image captured by a camera attached thereto and provide the user with information related to an object, a person, or the like, for example, viewed by the user based on recognition results.

However, there remains a problem as described below in providing such service. First, when a wearable device is configured as a battery-powered mobile device, it is necessary to reduce its weight because the user wears the device on his or her body. Thus, there is a problem with restrictions on the capacity of a battery provided in the wearable device. Accordingly, the time available for the user to use continuously the device is limited.

Second, because of the nature of the device worn by the user, blurring occurs with the movement of a photographer depending on the timing of photographing. Thus, if a service of allowing a camera to be continuously running and to perform automatic photographing is assumed, improper environment recognition is performed due to blurring contained in a photographed image and thus an erroneous recognition or delay in processing may be occurred. In addition, when recognition is necessary to be performed in a very short time such as when a subject is moving, it is more likely to result in failed recognition.

Third, in general, when environment recognition is performed based on the output of an image sensor, for example, if an object is specified, or a photographing location or a posture of the photographer is specified, an additional large amount of data for reference is necessary. Such data for reference is difficult to store in a wearable device, and thus a method of sending a photographed image to a server that stores the data for reference and of causing the server to perform image recognition may be considered. However, the transmission of a large amount of data, such as data of moving images captured for a long time, to a server is considered to be impractical in view of communication speed, battery performance, or the like in the current mobile communication environment.

Thus, in view of the foregoing situation, the information processing apparatus 10 according to an embodiment of the present disclosure has been conceived. The information processing apparatus 10 is capable of controlling adaptively the timing of photographing depending on the action state of the user. In addition, the information processing apparatus 10, when transmitting a photographed image to a server 20, can reduce adaptively communication traffic.

<<2. Basic Configuration of Information Processing System>>

The basic configuration of an information processing system that is common to each embodiment is described below with reference to FIG. 1. As illustrated in FIG. 1, the information processing system according to each embodiment includes the information processing apparatus 10, a communication network 12, and the server 20.

<2-1. Information Processing Apparatus 10>

The information processing apparatus 10 is an example of the information processing apparatus according to an embodiment of the present disclosure. The information processing apparatus 10 is, for example, a device provided with a glasses-type display, as illustrated in FIG. 1. In addition, a translucent see-through type display can be employed as the glasses-type display. This see-through type display enables the user to view the outside environment through the display.

The information processing apparatus 10 is used by being worn on the user's head. In addition, as illustrated in FIG. 1, the information processing apparatus 10 has a camera 166, which will be described later, at a position in the periphery of the display. The user can photograph a landscape at which the user is looking with the camera 166 while moving by wearing the information processing apparatus 10.

[2-1-1. Hardware Configuration]

Figure 2:
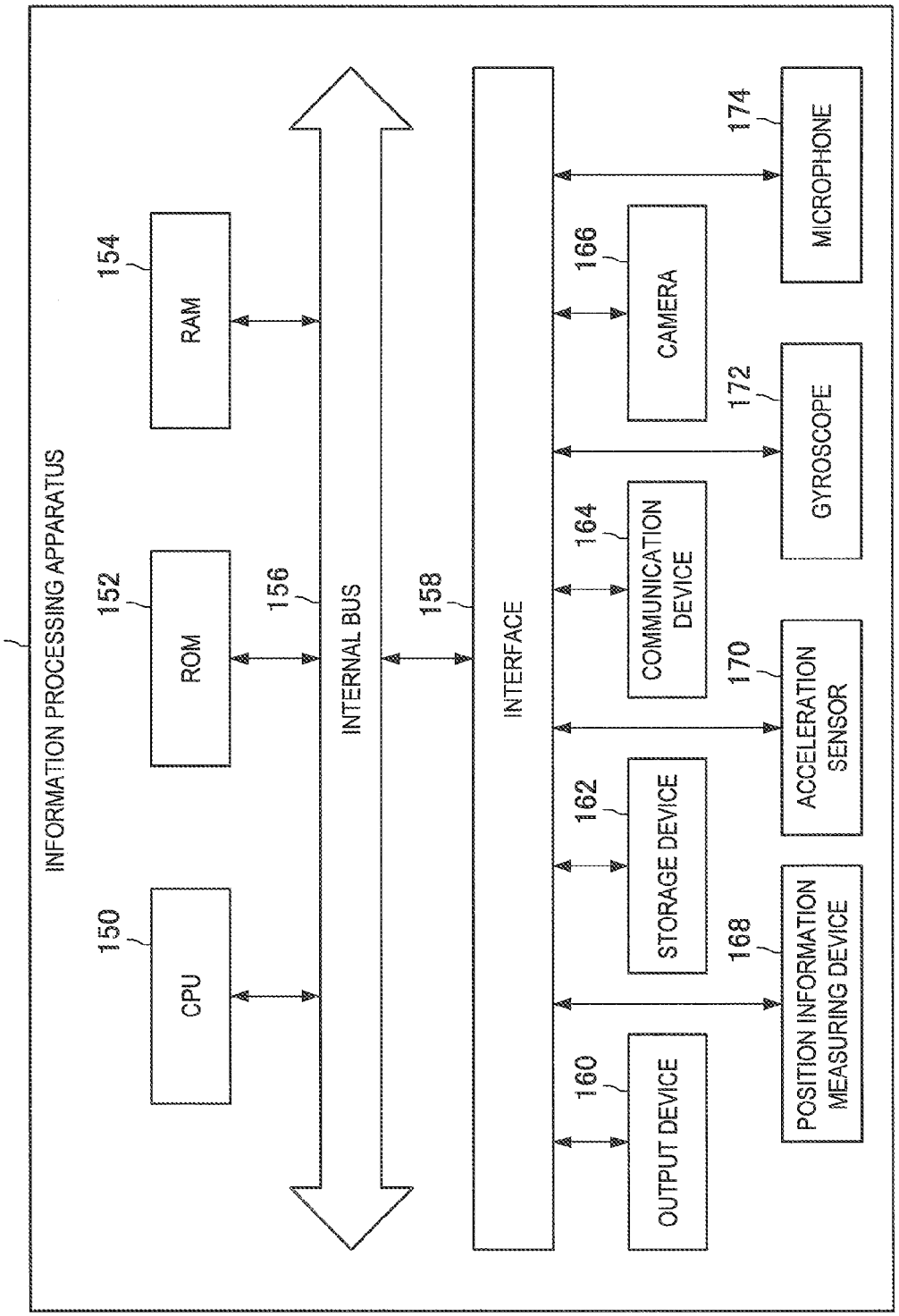
FIG. 2 is a diagram for describing the hardware configuration of an information processing apparatus 10 according to each embodiment of the present disclosure.

The information processing apparatus 10 may have such hardware configuration as illustrated in FIG. 2. As illustrated in FIG. 2, the information processing apparatus 10 is configured to include a central processing unit (CPU) 150, a read only memory (ROM) 152, a random access memory (RAM) 154, an internal bus 156, an interface 158, an output device 160, a storage device 162, a communication device 164, a camera 166, a position information measuring device 168, an acceleration sensor 170, a gyroscope 172, and a microphone 174.

(CPU 150)

The CPU 150 is composed of a various types of processing circuits and serves as a controller 100 for controlling the entire information processing apparatus 10. In addition, in the information processing apparatus 10, the CPU 150 implements each function of an action recognition unit 102, a photographing control unit 104, a transmission control unit 106, a display control unit 108, an image processing unit 110, a face region detection unit 112, and a blur determination unit 114, which are described later.

(ROM 152)

The ROM 152 stores a program used by the CPU150 and it also stores data for control of operation parameters or the like to be used by the CPU 150.

(RAM 154)

The RAM 154 stores temporarily a program, for example, to be executed by the CPU 150.

(Interface 158)

The interface 158 connects the output device 160, the storage device 162, the communication device 164, the camera 166, the position information measuring device 168, and acceleration sensor 170, the gyroscope 172, and the microphone 174 with the internal bus 156. For example, the output device 160 exchanges data with the CPU 150 and other components via the interface 158 and the internal bus 156.

(Output Device 160)

The output device 160 includes a display device such as a liquid crystal display (LCD), an organic light emitting diode (OLED), and a lamp. This display device displays an image captured by the camera 166, an image generated by the CPU 150, or the like.

Furthermore, the output device 160 includes an audio output device such as a loudspeaker. This audio output device converts audio data or the like into sound and outputs it.

(Storage Device 162)

The storage device 162 is a device for storing data, which is used to store a program or various data to be executed by the CPU 150. The storage device 162 includes a storage medium, a recording device for recording data in a storage medium, a reading device for reading out data from a storage medium, a deletion device for deleting data recorded in a storage medium, or the like.

(Communication Device 164)

The communication device 164 is a communication interface that is composed of a communication device or the like used to connect to a communication network such as a public network or the Internet. In addition, the communication device 164 may be a wireless LAN compatible communication device, a long-term evolution (LTE) compatible communication device, or a wired communication device that performs communication through a wired line. The communication device 164 serves, for example, as a communication unit 120 that will be described later.

(Camera 166)

The camera 166 has functions of forming an image obtained from the outside through a lens on an image sensor, such as a charge-coupled device (CCD) or a complementary metal-oxide semiconductor (CMOS), and of photographing still or moving images.

(Position Information Measuring Device 168)

The position information measuring device 168 receives a positioning signal from a positioning satellite, such as the global positioning system or a global navigation satellite system (GLONASS), and thus measures its current position. In addition, the position information measuring device 168 may have functions of receiving Wi-Fi (registered trademark) radio waves from a plurality of base stations and measuring its current position based on the reception intensity of the received Wi-Fi radio waves and the positions of each base station. In addition, the position information measuring device 168 may have a function of measuring its current position based on communications with a Bluetooth access point. The position information measuring device 168 serves as a measurement unit 122 that will be described later.

(Acceleration Sensor 170)

The acceleration sensor 170 measures the acceleration of the information processing apparatus 10. The acceleration sensor 170 serves as the measurement unit 122.

(Gyroscope 172)

The gyroscope 172 measures the angle or the angular velocity of the information processing apparatus 10. For example, the gyroscope 172 detects the inertial force or the Coriolis force applied to the information processing apparatus 10 and thus measures the angular velocity of the information processing apparatus 10. The gyroscope 172 serves as the measurement unit 122.

(Microphone 174)

The microphone 174 collects sound coming from outside. The microphone 174 serves as the measurement unit 122.

The hardware configuration of the information processing apparatus 10 is not limited to the above-described configuration. For example, the information processing apparatus 10 may be configured without any one or more of the storage device 162, the position information measuring device 168, the acceleration sensor 170, the gyroscope 172, and the microphone 174.

<2-2. Communication Network 12>

The communication network 12 is a wired or wireless communication channel for information transmitted from a device connected to the communication network 12. For example, the communication network 12 may include public networks such as the Internet, telephone network, and satellite communication network, various local area networks (LANs) including Ethernet (registered trademark), and wide area networks (WANs). In addition, the communication network 12 may include a leased line network such as Internet protocol virtual private network (IP-VPN).

<2-3. Server 20>

The server 20 is an exemplary image processing apparatus according to an embodiment of the present disclosure. The server 20 has a function of performing image recognition on a photographed image. In addition, the server 20 includes a storage unit (not illustrated) for storing a plurality of data for reference that include various types of information in the real world.

The server 20, for example when receiving a photographed image from the information processing apparatus 10, performs image recognition on the photographed image, and so can recognize an object, a person, or the like contained in the photographed image. The server 20 can extract additional information that is information related to the recognized object, person, or the like from the plurality of data for reference stored in the storage unit, and can transmit the extracted additional information to the information processing apparatus 10.

Such a function of the server 20 makes it possible for the user carrying the information processing apparatus 10 to obtain a notification of detailed information related to buildings, goods, persons, or the like viewed by the user while moving around in the real world from the server 20. In addition, the user can know the reception of additional information from the server 20 through a change in video, audio, or vibration outputted from the output device 160 of the information processing apparatus 10. For example, the output device 160 superimposes the additional information on a display screen or changes the mode of vibration, thereby informing the user of the contents of information or the location direction.

<<3. Detailed Description Of Embodiments>>

The basic configuration of the information processing system according to each embodiment has been described above. Subsequently, each embodiment is described in detail.

<3-1. First Embodiment>

[3-1-1. Configuration of Information Processing Apparatus 10]

Figure 3:
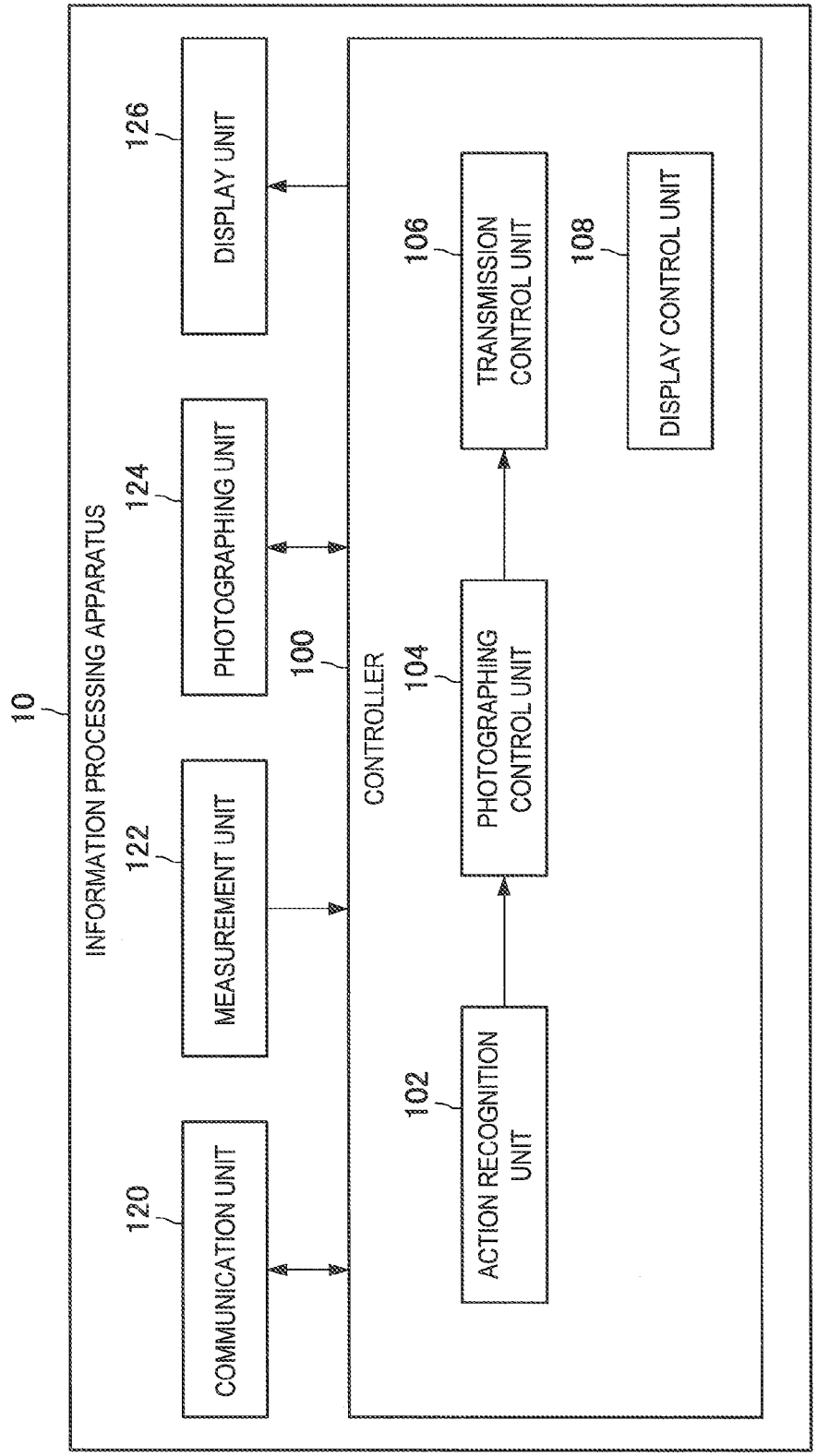
FIG. 3 is a functional block diagram illustrating the configuration of the information processing apparatus 10 according to a first embodiment of the present disclosure.

The configuration of the information processing apparatus 10 according to the first embodiment is described in detail. FIG. 3 is a functional block diagram illustrating the configuration of the information processing apparatus 10 according to the first embodiment. As illustrated in FIG. 3, the information processing apparatus 10 is configured to include a controller 100, a communication unit 120, a measurement unit 122, a photographing unit 124, and a display unit 126.

(3-1-1-1. Controller 100)

The controller 100 controls the overall operation of the information processing apparatus 10 using hardware, such as the CPU 150 and RAM 154, which is built in the information processing apparatus 10. In addition, as illustrated in FIG. 3, the controller 100 is configured to include an action recognition unit 102, a photographing control unit 104, a transmission control unit 106, and a display control unit 108.

(3-1-1-2. Action Recognition Unit 102)

The action recognition unit 102 recognizes an action state of the user based on the results of measurement by the measurement unit 122 that will be described later. The measurement unit 122 is an example of the sensor according to an embodiment of the present disclosure. The action state includes, for example, a movement state of the user, a vision-related state of the user, and a voice-related state of the user. The detailed processing of each state is described below.

—Recognition Example 1 (Recognition of Movement State)—

For example, the action recognition unit 102 is able to recognize a movement state of the user based on the results of measurement by the measurement unit 122. The movement state indicates states in which a user is walking, running, riding a bicycle, and riding in a vehicle such as automobiles, trains, and planes, or a state in which a user is stationary such as when the user is sitting in a chair.

Figure 4:
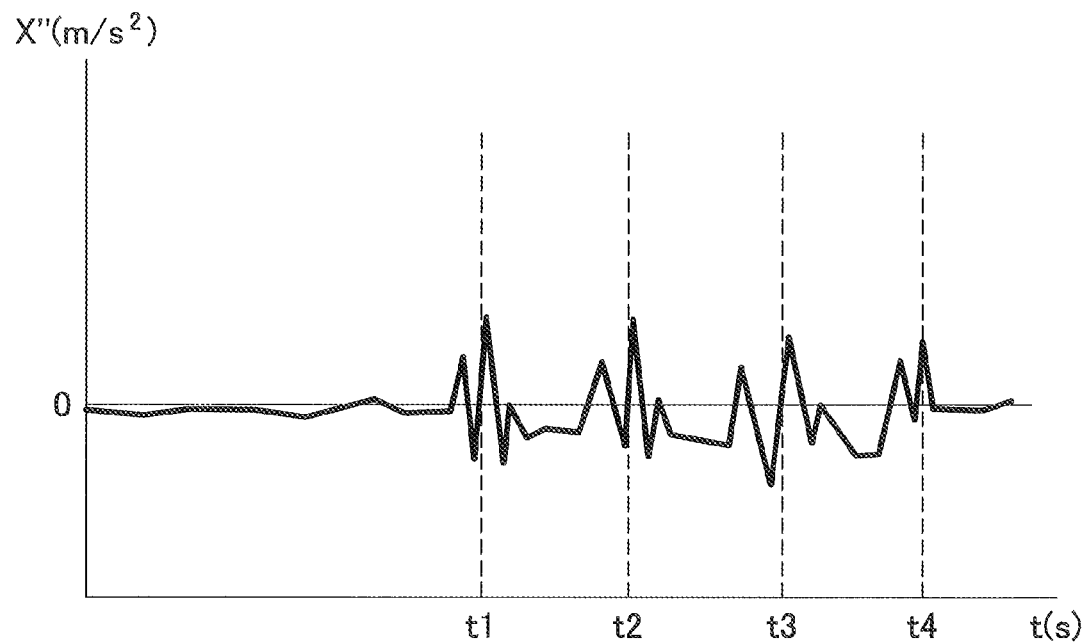
FIG. 4 is a diagram for describing an example of the action recognition by an action recognition unit 102 according to the first embodiment.

Referring to FIG. 4, a description of how it functions is given in more detail. FIG. 4 is a graph showing values obtained by measurement of the acceleration sensor 170 in association with measurement time. As shown in FIG. 4, the changes in acceleration having a substantially similar waveform are measured in time zones of time t1 to t2, time t2 to t3, and time t3 to t4. The change in acceleration having such a waveform approximates the change in acceleration when a person is walking. Thus, the action recognition unit 102 recognizes that the user is in walking state in the time zone from time t1 to t4, based on the measurement results obtained by the acceleration sensor 170, which are shown in FIG. 4.

—Recognition Example 2 (Recognition of Vision-related State)—

Furthermore, as recognition example 2, the action recognition unit 102 can recognize a vision-related state of the user based on the measurement results obtained by the measurement unit 122. The vision-related state indicates in what state and under what circumstances the user looks at an object. For example, the vision-related state indicates a state in which the user is watching a particular object or person, a state in which the user is looking around, or the direction in which the user is looking, such as the front or a vertical or horizontal direction.

More specifically, the action recognition unit 102 can recognize the user's vision-related state based on the movement of the user's head that is measured by the gyroscope 172. For example, when the gyroscope 172 measures that the speed of movement of the user's head is reduced to less than or equal to a predetermined value, the action recognition unit 102 recognizes that the user is watching.

Figure 5:
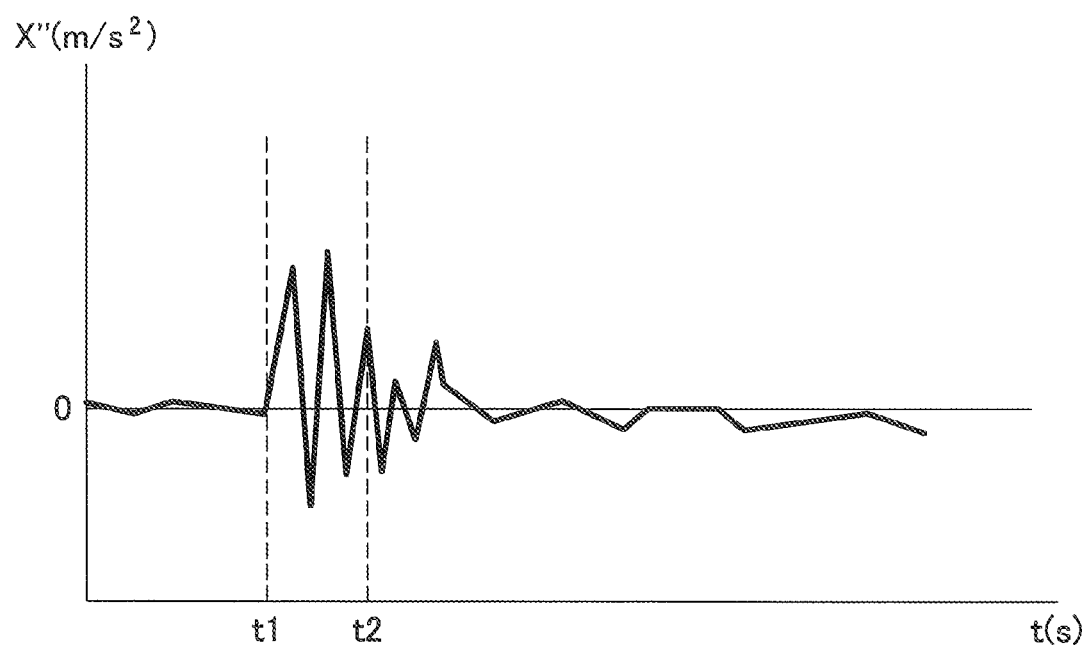
FIG. 5 is a diagram for describing an example of the action recognition by the action recognition unit 102 according to the first embodiment.
Figure 6:
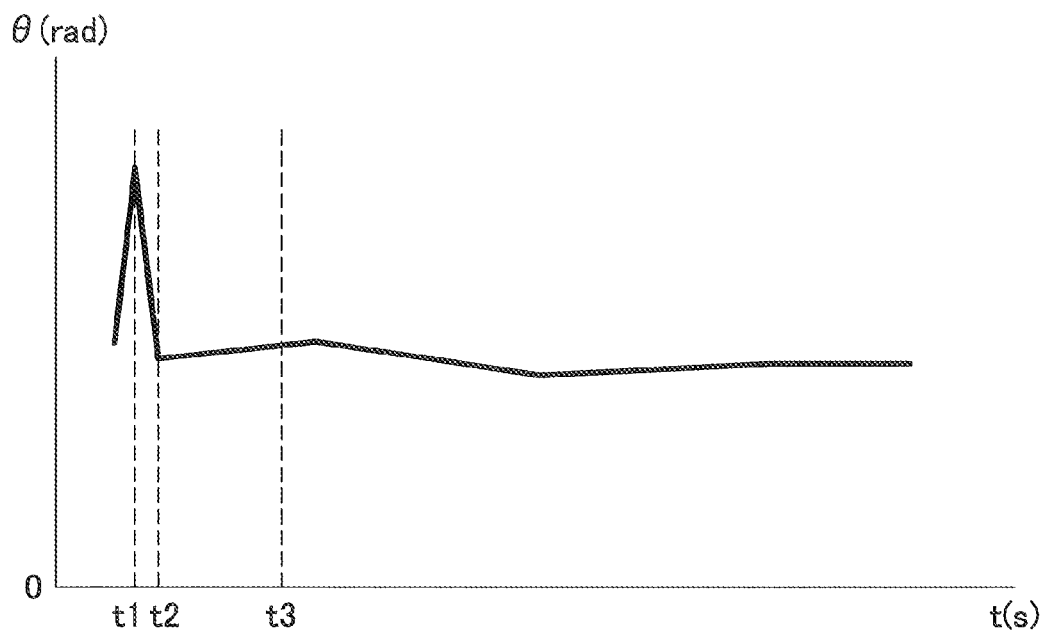
FIG. 6 is a diagram for describing an example of the action recognition by the action recognition unit 102 according to the first embodiment.

Referring to FIG. 5 or 6, a description of how it functions is given in more detail. FIG. 5 is an example of the graph showing measurement values obtained by the acceleration sensor 170 in association with measurement time. In the graph shown FIG. 5, the acceleration fluctuations in the time zone from time t1 to t2 are large, and after time t2, the fluctuation amount is significantly reduced and thus measured values of the acceleration are at or close to zero. The fluctuations in acceleration having the waveform as shown in FIG. 5 approximate the fluctuations in acceleration of the head when a person finds something and watches it at approximately time t2.

In addition, FIG. 6 is an example of the graph showing measurement values of the angle of the user's head obtained by the gyroscope 172 in association with measurement time. In the graph shown in FIG. 6, the angular fluctuations in the time zone from time t1 to t2 are large, and after time t2, the amount of fluctuations is significantly reduced and thus measured values of the angle are at a substantially fixed value. The acceleration fluctuations having the waveform as shown in FIG. 6 approximate the acceleration fluctuations of the head when the user moves his head and then stops its motion, such as when a person finds something and watches it at approximately time t2.

Thus, the action recognition unit 102 recognizes that the user is watching after the time t2, based on the measurement results obtained by the acceleration sensor 170 as shown in FIG. 5 and/or the measurement results obtained by the gyroscope 172 as shown in FIG. 6. The action recognition unit 102 also can recognize the action of the user moving his head and then stopping the motion based on the change in magnitude of the sound of blowing wind that is detected by the microphone 174 instead of the gyroscope 172.

Figure 7:
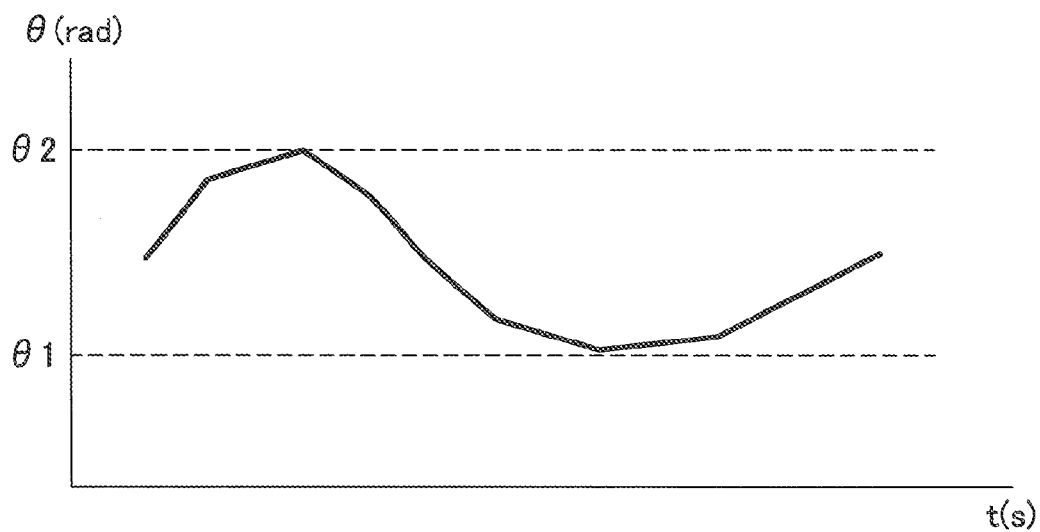
FIG. 7 is a diagram for describing an example of the action recognition by the action recognition unit 102 according to the first embodiment.
Figure 8:
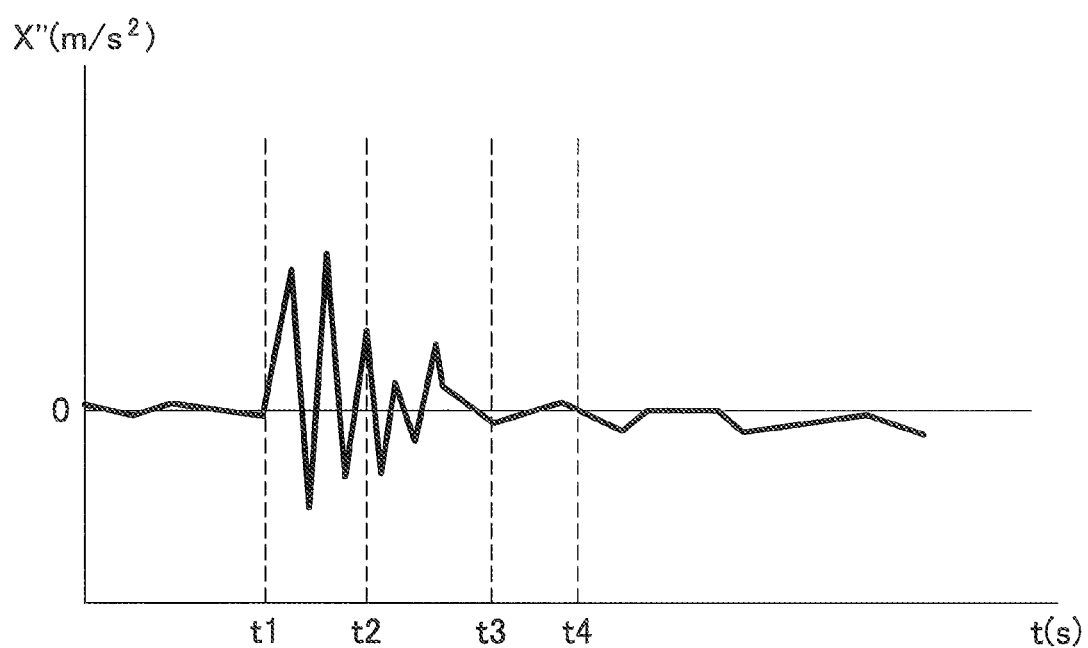
FIG. 8 is a diagram for describing an example of the photographing control by a photographing control unit 104 according to the first embodiment.

In addition, FIG. 7 is another example of the graph showing the values obtained by measuring the angle of the user's head in association with the measurement time. In the graph shown in FIG. 7, the angles fluctuate gradually between the angles θ1 and θ2 over the whole measurement period. The fluctuations in angle of the waveform as shown in FIG. 7 approximate the fluctuations in acceleration of a person's head, for example, when the person is looking around, wandering, or looking down. Thus, the action recognition unit 102 recognizes that, for example, the user is looking around over the whole measurement period based on the measurement results obtained by the acceleration sensor 170 as shown in FIG. 7.

—Recognition Example 3 (Recognition of Voice-related State)—

In addition, as recognition example 3, the action recognition unit 102 can recognize a voice-related state of the user based on the measurement results obtained by the measurement unit 122. The voice-related state indicates, for example, a state in which a user is talking with other people, a state in which a user is silent, or the degree of magnitude of the voice produced by a user.

For example, the action recognition unit 102 recognizes that a user is talking with other people based on the measurement results obtained by the microphone 174.

(3-1-1-3. Photographing Control Unit 104)

The photographing control unit 104 controls the timing at which a photographing unit 124 described later is allowed to perform photographing based on the action state of the user recognized by the action recognition unit 102. The following description herein is given based on an example in which the photographing control unit 104 allows the photographing unit 124 to capture still images. As its technical background, an embodiment of the present disclosure may be intended to reduce the power consumption as much as possible, but it is not limited to such an example. The photographing control unit 104 may allow the photographing unit 124 to capture moving images.

—Control Example 1 (Control based on Movement State)—

More specifically, the photographing control unit 104 can change the timing at which the photographing unit 124 is allowed to perform photographing based on whether a user is moving or not. For example, the photographing control unit 104 sets a frequency with which the photographing unit 124 is allowed to perform photographing when the user is stationary to be smaller than a frequency to be set when the user is moving. In general, when a user is stationary, it is assumed that the landscape viewed by user has a little change. Thus, with control example 1, an image in which it is assumed that the image is undesirable to the user or the image is not considered important can be prevented from being captured.

Figure 9:
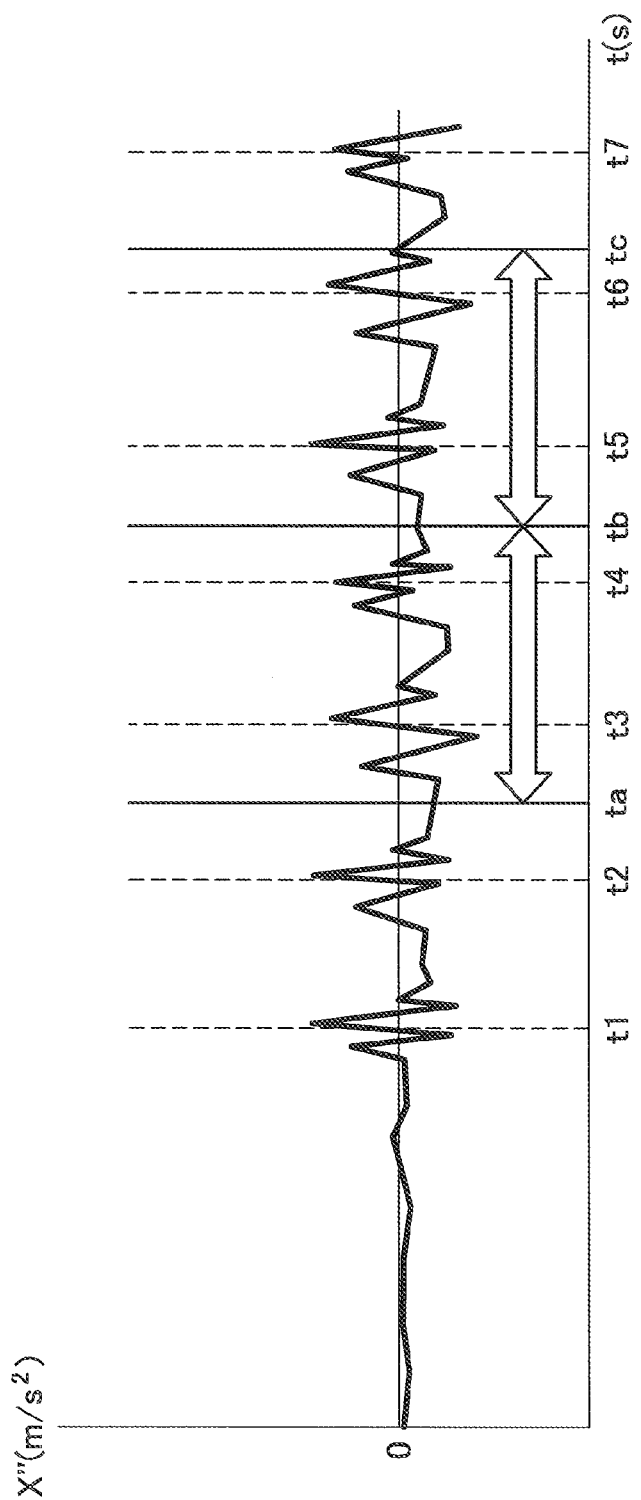
FIG. 9 is a diagram for describing an example of the photographing control by the photographing control unit 104 according to the first embodiment.

Furthermore, the photographing control unit 104 allows the photographing unit 124 to perform photographing at predetermined time intervals when a user continues to move. Referring to FIG. 9, a description of how it functions is given in more detail. FIG. 9 is an example of the graph showing the measurement results obtained by the acceleration sensor 170 in association with measurement time. In FIG. 9, there are illustrated the results in which the acceleration fluctuations in the time zones from time t1 to t7 that are similar to the acceleration fluctuations in the time zone from time t1 to t2 shown in FIG. 4 are continuously measured. In addition, in FIG. 9, the duration between time tb and tc is assumed to be the same as the duration between time ta and tb.

In the time zones from time t1 to t7 shown in FIG. 9, the action recognition unit 102 recognizes that a user is in walking state. Thus, the photographing control unit 104 allows the photographing unit 124 to perform photographing at the time interval between times ta and tb so that photographing is performed, for example, at time ta, tb, and tc in FIG. 9.

In general, when a user is walking or is riding a train, the surrounding landscape viewed through the eyes of the user changes generally from moment to moment. Thus, according to control example 1, it is possible to photograph a sequence of images by capturing the change in landscapes with the movement of the user even without capturing moving images. Accordingly, the number of photographing times by the photographing unit 124 can be decreased, thereby reducing the power consumption.

—Control Example 2 (Control based on Vision-related State)—

In addition, as control example 2, the photographing control unit 104 can change the timing at which the photographing unit 124 is allowed to perform photographing based on the vision-related state of a user that is recognized by the action recognition unit 102. For example, when the action recognition unit 102 recognizes that a user is watching as immediately after time t2 shown in FIG. 5 or 6, the photographing control unit 104 allows the photographing unit 124 to perform photographing.

According to control example 2, when a user is watching, for example, goods displayed in a department store, a building or structure in a tour place, or a person who a user saw on the street, it is possible to photograph the object that is being watched by the user in reliable and immediate manner.

As a modification, when an action in which a user moves his head or neck is recognized, it is estimated that the user is watching, and thus the photographing control unit 104 may allow the photographing unit 124 to perform photographing in a continuous way in accordance with the movement of the user's head or neck. According to this modification, there is an advantage that a change in how the user watched during photographing can be recorded.

—Control Example 3 (Control based on Voice-related State)—

In addition, as control example 3, the photographing control unit 104 is able to allow the photographing unit 124 to perform photographing when the action recognition unit 102 recognizes that a user has spoken. According to this control example 3, when a user is talking with other people, it is possible for the user to photograph the conversation partner automatically, for example, without having to release the shutter.

(3-1-1-4. Transmission Control Unit 106)

The transmission control unit 106 allows the photographing unit 120 to transmit, for example, an image photographed by the photographing unit 124 to the server 20.

(3-1-1-5. Display Control Unit 108)

The display control unit 108 allows the display unit 126, which will be described later, to display, for example, various character strings or images such as additional information received from the server 20.

Figure 10:
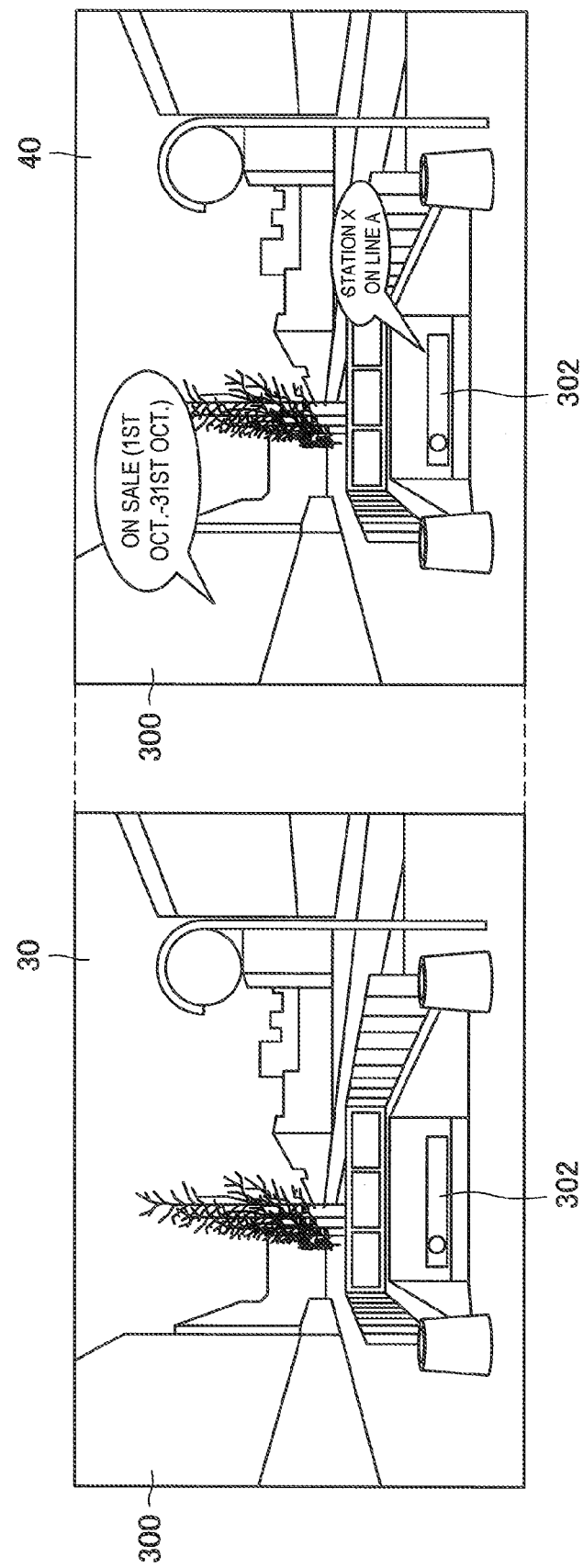
FIG. 10 is a diagram for describing an example of the display control by a display control unit 108 according to the first embodiment.

Referring to FIG. 10, a description of how it functions is given in more detail. FIG. 10 is a diagram for describing a display example in which additional information received from the server 20 is displayed on the display unit 126. The left side view of FIG. 10 is an example of a photographed image (a photographed image 30) captured by the photographing unit 124. In addition, the right side view of FIG. 10 is an example (a picture 40) in which the photographed image 30 is transmitted to the server 20 and then additional information received from the server 20 is displayed on the display unit 126. FIG. 10 illustrates an example in which the information processing apparatus 10 receives, from the server 20, additional information about the advertisement of "ON SALE (October 1-October 31)" for a department store 300 contained in the photographed image 30 or addition information indicating a station name of "STATION X ON LINE A" for a station 302.

As illustrated in the right side view of FIG. 10, the display control unit 108 superimposes a display that indicates additional information received from the server 20 on the picture 40. For example, when the display unit 126 is composed of a see-through type display, the picture 40 is a landscape at which the user is actually looking through the display. Alternatively, the display control unit 108 may display an image, which is the same as the photographed image 30, as the picture 40.

(3-1-1-6. Communication Unit 120)

The communication unit 120 transmits and receives information to and from various types of devices connected to the communication network 12, for example, by wireless communication. For example, the communication unit 120 transmits the image photographed by the photographing unit 124 to the server 20 under the control of the transmission control unit 106. In addition, the communication unit 120 receives the above-described additional information from the server 20.

(3-1-1-7. Measurement Unit 122)

The measurement unit 122 is composed, for example, of the position information measuring device 168, the acceleration sensor 170, the gyroscope 172, and the microphone 174. The measurement unit 122 measures acceleration of the information processing apparatus 10, an angle of the information processing apparatus 10, or the sound coming from outside.

In the first embodiment, the measurement unit 122 is basically assumed to perform continuous measurement. The reason for this is, for example, because various sensors such as the acceleration sensor 170 are continuously activated but their power continuously consumed is substantially smaller than the power consumed by photographing of the camera 166.

(3-1-1-8. Photographing Unit 124)

The photographing unit 124 photographs an outside still or moving image under the control of the photographing control unit 104.

In addition, the photographing unit 124 can also photograph an outside sill or moving image, for example, in accordance with an instruction from the user to an input device (not illustrated) such as a button attached to the information processing apparatus 10. The following description herein is given based on an example in which the photographing unit 124 photographs an image under the control of the photographing control unit 104.

(3-1-1-9. Display Unit 126)

The display unit 126 displays, for example, various character strings or images such as additional information received from the server 20 under the control of the display control unit 108.

The configuration of the information processing apparatus 10 according to the first embodiment is not limited to the above-described configuration. For example, the measurement unit 122 may not be included in the information processing apparatus 10 but may be included in other devices.

[3-1-2. Operation]

The configuration according to the first embodiment has been described above. Next, the operation according to the first embodiment is described.

Figure 11:
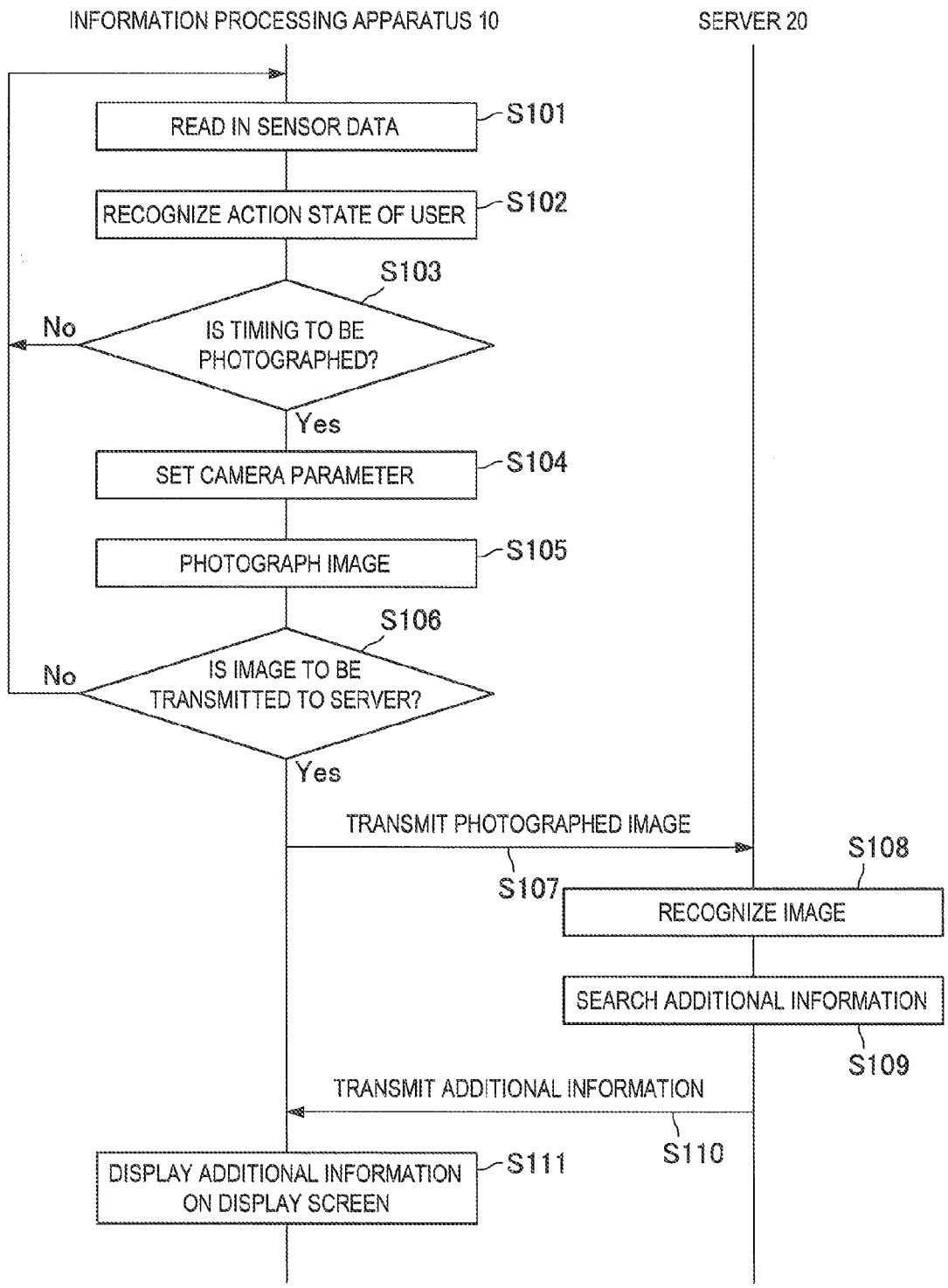
FIG. 11 is a sequence diagram illustrating the operation according to the first embodiment.

FIG. 11 is a sequence diagram illustrating the operation according to the first embodiment. As illustrated in FIG. 11, the measurement unit 122 of the information processing apparatus 10 measures, for example, acceleration of the information processing apparatus 10, an angle of the information processing apparatus 10, or the sound coming from outside (S101).

Subsequently, the action recognition unit 102 recognizes an action state of the user based on the measurement results measured in step S101 (S102).

Subsequently, the photographing control unit 104 determines whether the present is the timing at which the photographing unit 124 is allowed to perform photographing based on the action state of the user that is recognized in step S012 (S103). If it is not determined that the present is the timing at which the photographing unit 124 is allowed to perform photographing (S103: NO), then the information processing apparatus 10 performs the operation of S101 again.

On the other hand, if it is determined that the present is the timing at which the photographing unit 124 is allowed to perform photographing (S103: YES), then the photographing control unit 104 adjusts various types of parameters such as photographic sensitivity or shutter speed to an appropriate value, for example, based on information including brightness of a surrounding environment (S104). Then, the photographing control unit 104 allows the photographing unit 124 to perform photographing (S105).

Subsequently, the transmission control unit 106 determines whether the image photographed in step S105 is transmitted to the server 20, for example, based on a predetermined condition of whether the photographed image contains an object, a person, or the like (S106). If it is not determined that the image is transmitted (S106: NO), then the information processing apparatus 10 performs the operation of step S101 again.

If it is determined that the image is transmitted (S106: YES), then the transmission control unit 106 allows the communication unit 120 to transmit the photographed image to the server 20 (S107).

Subsequently, the server 20 performs image recognition on the image received from the information processing apparatus 10 (S108). Then, the server 20 extracts additional information about the object, person, or the like recognized from the received image, for example, from a large amount of reference data stored in a storage unit of the server 20 (S109). Then, the server 20 transmits the extracted additional information to the information processing apparatus 10 (S110).

Then, the display control unit 108 of the information processing apparatus 10 allows the display unit 126 to display the additional information received from the server 20 (S111).

[3-1-3. Advantages]

In the above, as described, for example, with reference to FIGS. 3, 11, and other illustrations, the information processing apparatus 10 according to the first embodiment recognizes an action state of the user based on the measurement results obtained by the measurement unit 122 and controls the timing at which the photographing unit 124 is allowed to perform photographing based on the recognized action state. Thus, it is possible to control adaptively the timing of photographing depending on the action state of the user.

For example, when it is recognized that a user is not moved while remaining stationary, the information processing apparatus 10 sets the frequency with which the photographing unit 124 is allowed to perform photographing to be smaller than a frequency to be set when the user is moving. In general, when a user is stationary, it is assumed that the landscape at which user is looking has a little change. Thus, an image where it is assumed that the image is undesirable to the user or the image is not considered important can be significantly prevented from being photographed. Accordingly, the power consumed by photographing can be reduced.

[3-2. Second Embodiment]

The first embodiment has been described above. Next, a second embodiment is described. As described later, according to the second embodiment, an information processing apparatus 10 can reduce the amount of information of the image transmitted to the server 20, thereby reducing the power consumption.

[3-2-1. Configuration of Information Processing Apparatus 10]

Figure 12:
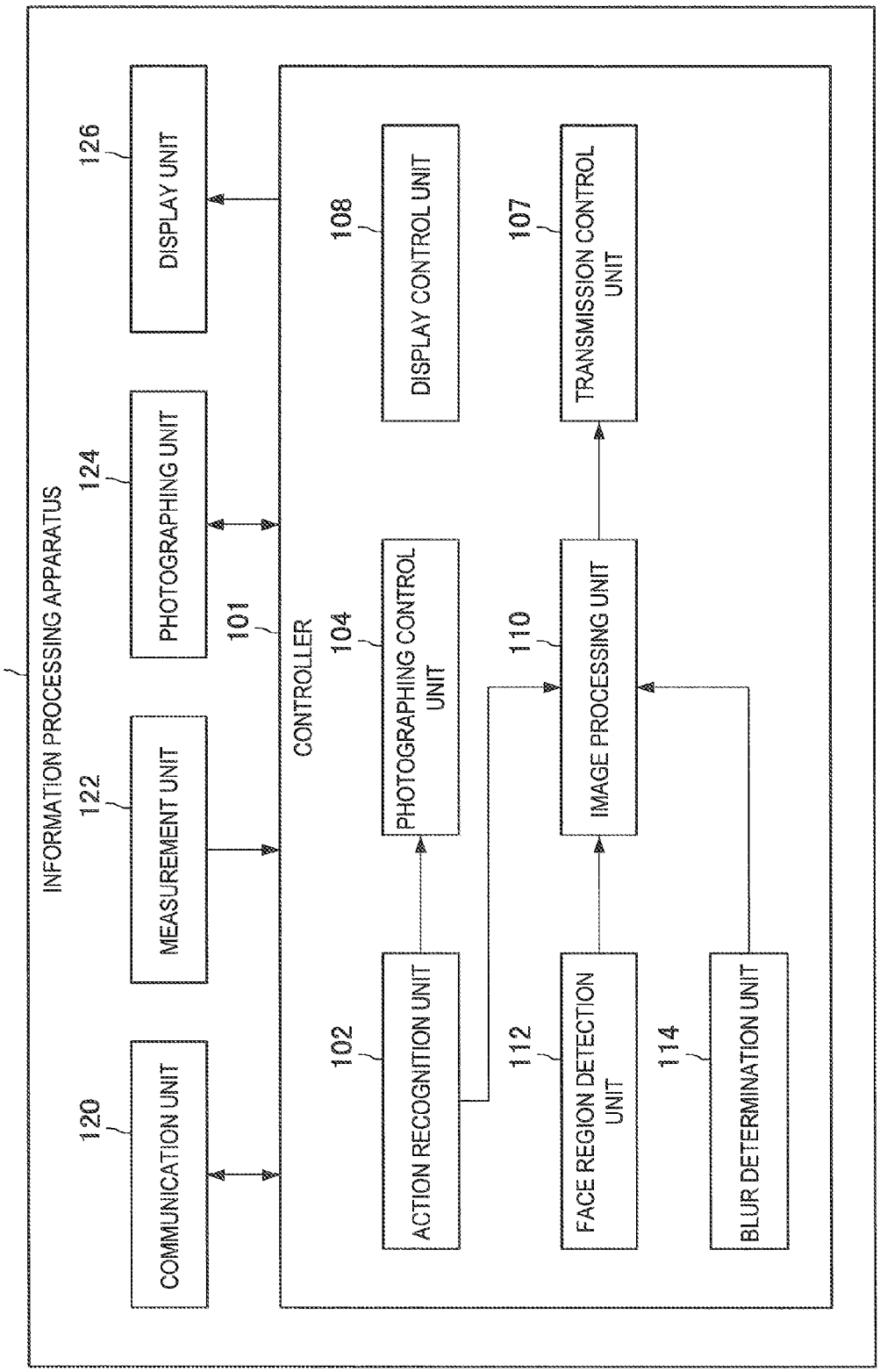
FIG. 12 is a functional block diagram illustrating the configuration of the information processing apparatus 10 according to a second embodiment of the present disclosure.

The configuration of the information processing apparatus 10 according to the second embodiment is first described in detail. FIG. 12 is a functional block diagram illustrating the configuration of the information processing apparatus 10 according to the second embodiment. As illustrated in FIG. 12, the information processing apparatus 10 further includes an image processing unit 110, a face region detection unit 112, and a blur determination unit 114, as compared with the configuration of the first embodiment.

(3-2-1-1. Transmission Control Unit 107)

A transmission control unit 107 according to the second embodiment allows the communication unit 120 to transmit an image processed by an image processing unit 110 described later to the server 20. More specifically, the transmission control unit 107 can cause the image, which is generated by the image processing unit 110 and has the reduced amount of information, to be transmitted to the server 20 based on the photographed image captured by the photographing unit 124.

As described in detail later, for example, the transmission control unit 107 causes the image of a particular region clipped from the photographed image by the image processing unit 110 to be transmitted to the server 20. Alternatively, the transmission control unit 107 causes the image obtained by reducing the resolution from the photographed image by the image processing unit 110 to be transmitted to the server 20. Alternatively, the transmission control unit 107 causes an image of one or more face regions of a person that is clipped from the photographed image by the image processing unit 110 to be transmitted to the server 20.

In addition, as a modification, if the blur determination unit 114 described later determines that blurring of the photographed image is greater than or equal to a threshold, then the transmission control unit 107 may also cause the photographed image to be not transmitted to the server 20.

(3-2-1-2. Image Processing Unit 110)

The image processing unit 110 performs a process regarding the amount of information on the image photographed by the photographing unit 124 based on an action state of the user that is recognized by the action recognition unit 102 during photographing by the photographing unit 124. More specifically, the image processing unit 110 can generate an image obtained by reducing the amount of information from the photographed image using a way corresponding to the action state of the user that is recognized by the action recognition unit 102 during photographing by the photographing unit 124.

—Processing Example 1 (Reduction in Resolution)—

For example, when the action recognition unit 102 recognizes that, for example, a user looks around, downward, or upward when during photographing, the image processing unit 110 generates an image obtained by compressing resolution from the photographed image.

Figure 13:
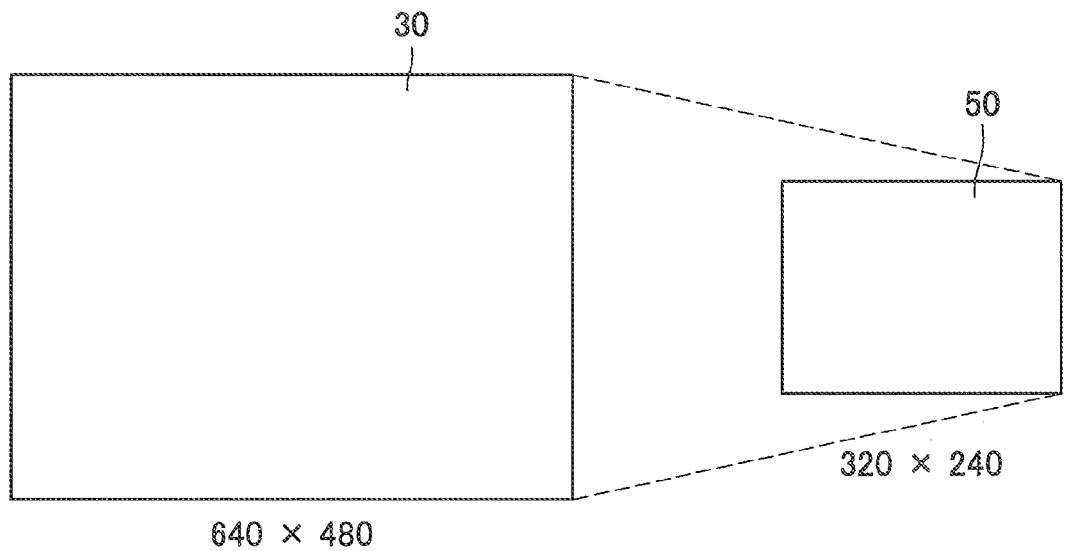
FIG. 13 is a diagram for describing an example of the image processing by an image processing unit 110 according to the second embodiment.

Referring to FIG. 13, a description of how it functions is given in more detail. FIG. 13 is a diagram for describing a generation example in which an image with compressed resolution (processed image 50) is generated from the photographed image (photographed image 30). As illustrated in FIG. 13, for example, the image processing unit 110 generates the processed image 50 that is an image with the compressed resolution of 320×240 from the photographed image 30 with resolution of 640×480).

In general, when a user looks around, downward, or upward, it is assumed that the user looks at a region of wider angle than usual. According to processing example 1, by compressing the resolution of the photographed image, it is possible to reduce the amount of information of the image without reducing the photographing range in which the user is intended to perform photographing.

—Processing Example 2 (Clipping of Particular Region)—

In addition, as processing example 2, when the action recognition unit 102 recognizes that a user is watching during photographing, the image processing unit 110 can generate an image obtained by clipping a predetermined region from the photographed image.

Figure 14:
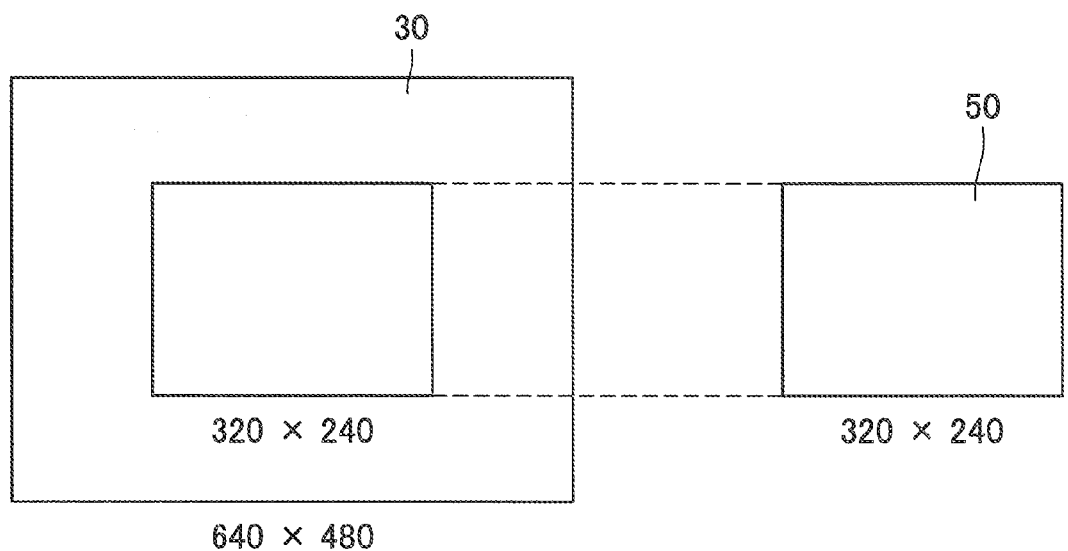
FIG. 14 is a diagram for describing an example of the image processing by the image processing unit 110 according to the second embodiment.

Referring to FIG. 14, a description of how it functions is given in more detail. FIG. 14 is a diagram for describing a generation example of generating an image (processed image 50) obtained by clipping a predetermined region in the photographed image 30 from the photographed image (photographed image 30). As illustrated in FIG. 14, for example, the image processing unit 110 generates the processed image 50 that is an image obtained by clipping a region with the resolution of 320×240 that is a central portion of the photographed image 30 from the photographed image 30 with the resolution of 640×480. The size of the predetermined region may be set, for example, in accordance with the maximum bit width of the communication line for transmission to the server 20.

—Processing Example 2a (Clipping of Particular Region in Walking)—

In addition, when the action recognition unit 102 recognizes that a user is moving during photographing, the image processing unit 110 can also generate an image obtained by clipping a predetermined region from the photographed image.

Figure 15:
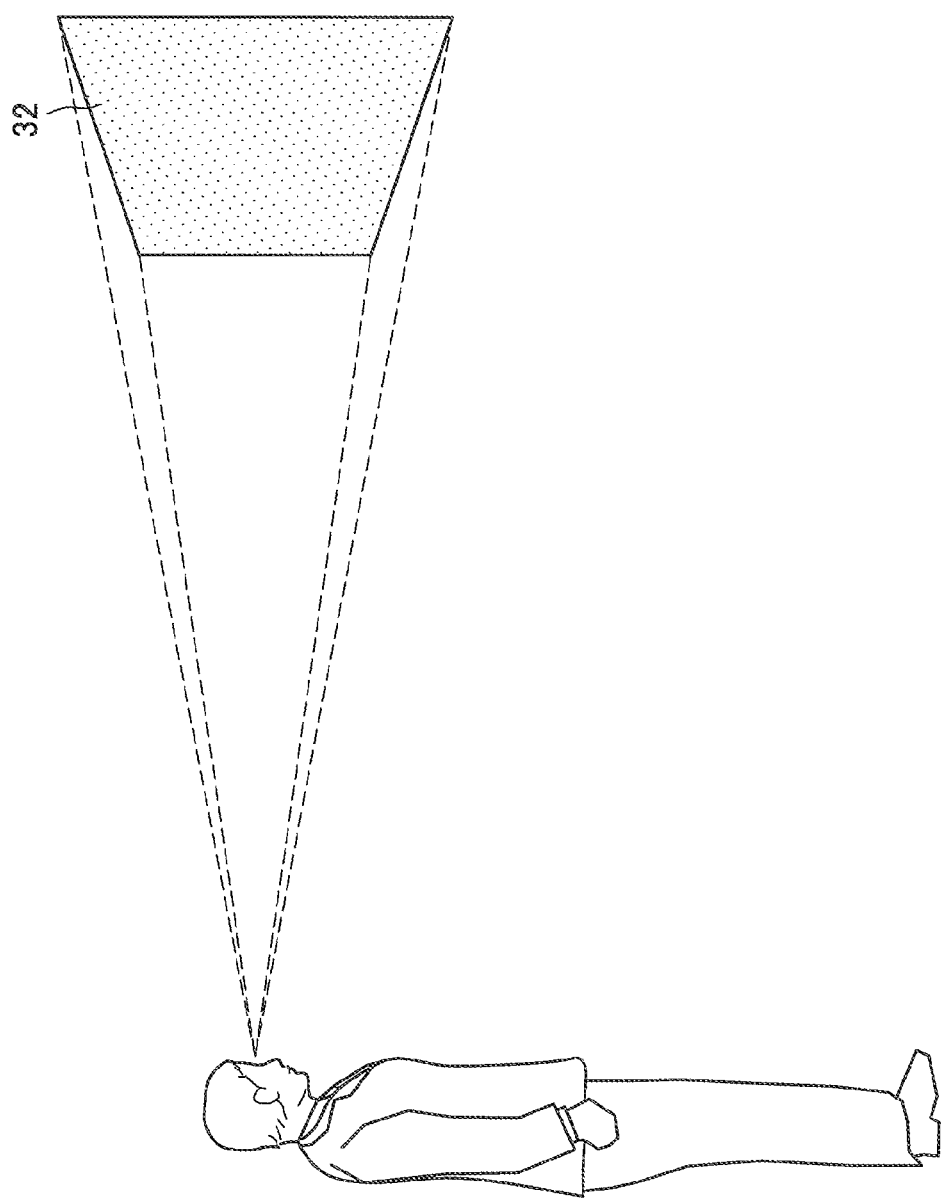
FIG. 15 is a diagram for describing a state in which a user looks forward and then is stationary.

Referring to FIGS. 15 to 18, a description of how it functions is given in more detail. FIG. 15 is a diagram for describing a state in which a user is stationary while looking forward. FIG. 15 illustrates a visible area 32 at which the user is looking as a plan view for simplicity of description.

Figure 16:
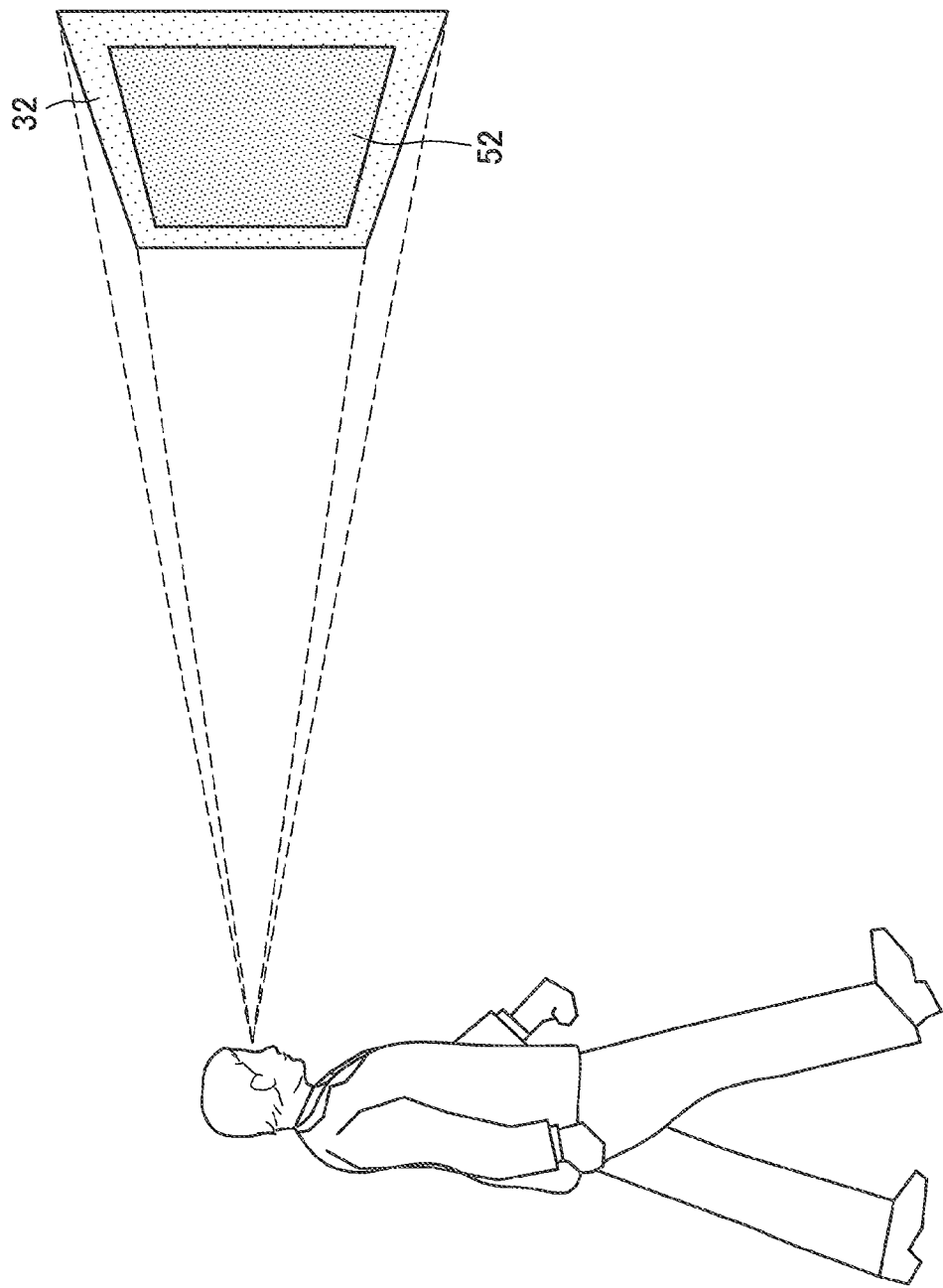
FIG. 16 is a diagram for describing a state in which a user is walking while looking forward.

In addition, FIG. 16 is a diagram for describing a state in which a user is walking while looking forward. In general, the field of view of the user when walking is smaller than that when the user is stationary, and thus the user tends to look at a region 52 smaller than the visible region 32 of the user when stationary, as illustrated in FIG. 16.

Figure 17:
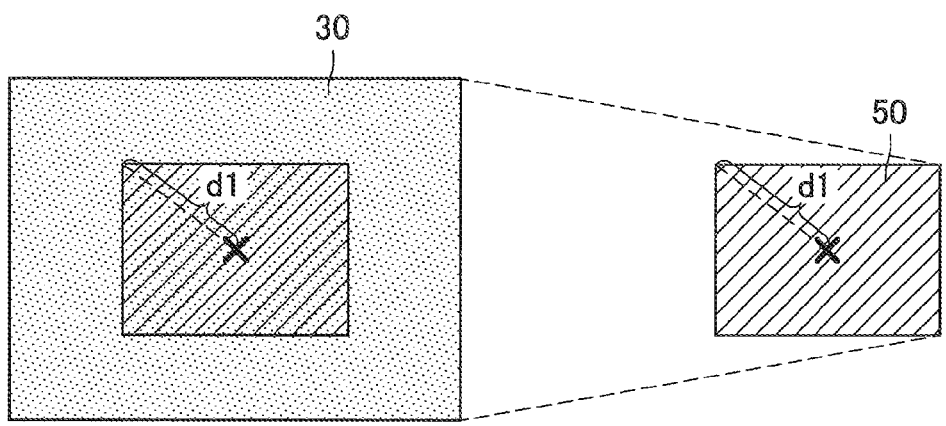
FIG. 17 is a diagram for describing an example of image processing by the image processing unit 110 according to the second embodiment.

Thus, when it is recognized that the user is walking while looking forward during photographing, for example, the image processing unit 110 may generate an image that is obtained by clipping a region within a predetermined distance from the center in the photographed image as illustrated in FIG. 17. FIG. 17 illustrates a generation example of an image (processed image 50) obtained by clipping a region within the distance d1 from the center in the photographed image (photographed image 30). According to this generation example, an image of an object, a person, or the like that is watched by the user during photographing can be clipped appropriately, and the amount of information of an image can be reduced.

Figure 18:
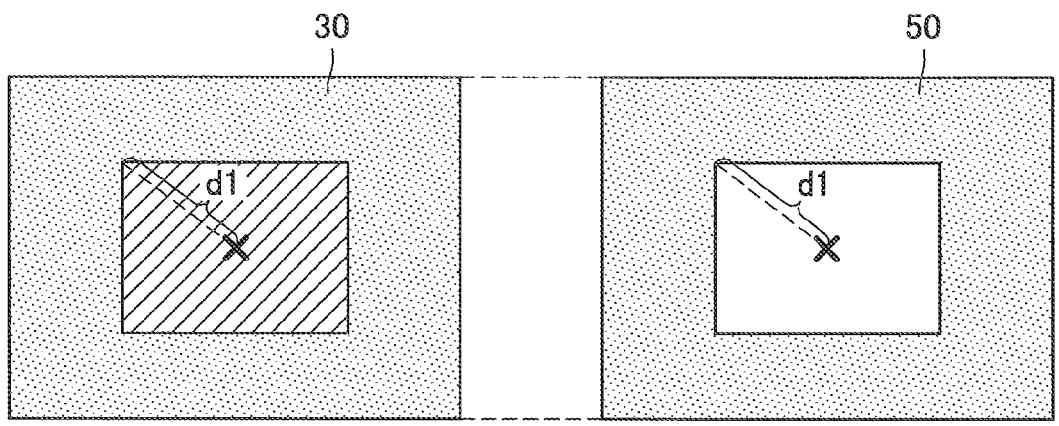
FIG. 18 is a diagram for describing an example of image processing by the image processing unit 110 according to the second embodiment.

Alternatively, in such a case, the image processing unit 110 may generate an image that is obtained by clipping a peripheral region at a predetermined distance or more away from the center in the photographed image as illustrated in FIG. 18. FIG. 18 illustrates a generation example of the image (processed image 50) that is obtained by clipping a peripheral region at the distance d1 or more away from the center in the photographed image (photographed image 30).

According to this generation example, it is possible to extract an image of an object, a person, or the like that is not watched by the user during photographing. Thus, when the clipped image is transmitted to the server 20 and additional information regarding the clipped image is received from the server 20, it is advantageously possible for the user to know information regarding an object or a person that is not noticed or is little considered by the user during photographing.

—Processing Example 2b (Clipping of Particular Region in Looking Down)—

In addition, when the action recognition unit 102 recognizes that a user is looking down during photographing, the image processing unit 110 can clip a region from the photographed image such that the region to be clipped is within a predetermined distance from the lower end of the photographed image.

Figure 19:
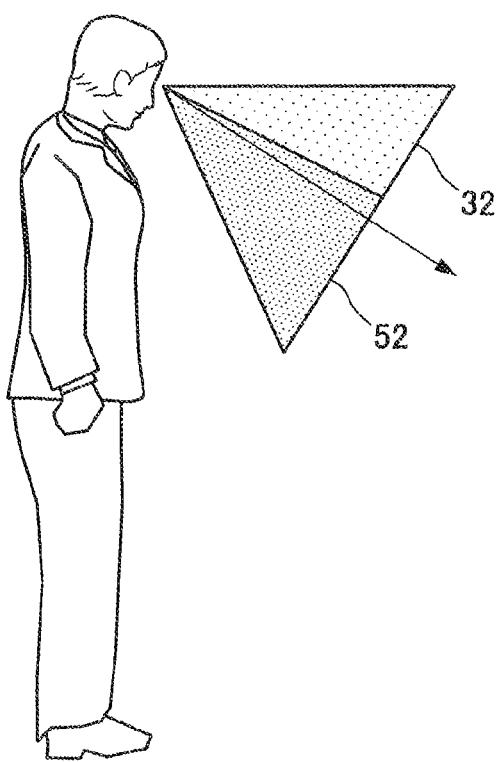
FIG. 19 is a diagram for describing a state in which a user looks down and then is stationary.
Figure 20:
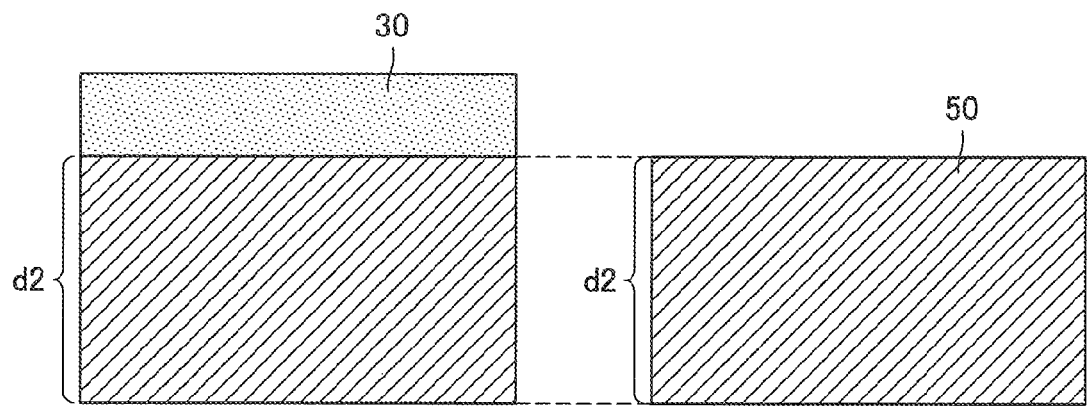
FIG. 20 is a diagram for describing an example of image processing by the image processing unit 110 according to the second embodiment.

Referring to FIGS. 19 and 20, a description of how it functions is given in more detail. FIG. 19 is a diagram for describing a state in which a user looks downward and is stationary. As illustrated in FIG. 19, in general, when a user tilts his head to look down, for example, the user casts his eyes downward, and thus the user tends to look at a region 52 in the lower side than the visible region 32 when the eyes look forward.

Thus, when the action recognition unit 102 recognizes that a user looks down during photographing, the image processing unit 110 may generate an image (processed image 50) that is obtained by clipping a region from the photographed image (photographed image 30) such that the region to be clipped is within the distance d2 from the lower end of the photographed image as illustrated in FIG. 20. The value of the distance d2 can be set as an appropriate fixed value, for example, by performing a user test in advance.

—Processing Example 2c (Clipping of Particular Region in Looking Upward)—

In addition, when the action recognition unit 102 recognizes that a user looks upward during photographing, the image processing unit 110 can clip a region from the photographed image such that the region to be clipped is within a predetermined distance from the upper end of the photographed image.

Figure 21:
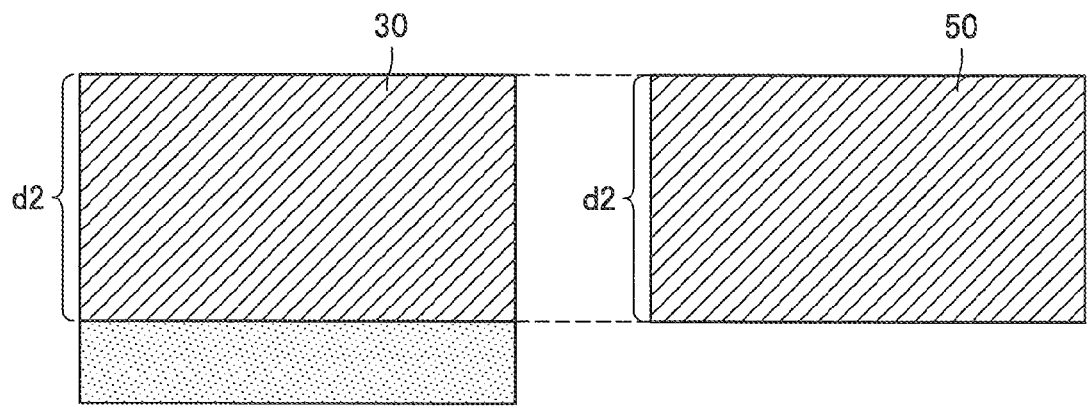
FIG. 21 is a diagram for describing an example of image processing by the image processing unit 110 according to the second embodiment.

Referring to FIG. 21, a description of how it functions is given in more detail. In general, when a user tilts his head to look upward, the user casts his eyes upward as opposed to when the user looks down, and thus the user tends to look at a region in the upper side than when the eyes look forward.

Thus, when the action recognition unit 102 recognizes that a user looks upward during photographing, the image processing unit 110 may generate an image (processed image 50) that is obtained by clipping a region from the photographed image (photographed image 30) such that the region to be clipped is within the distance d2 from the upper end of the photographed image 30 as illustrated in FIG. 21.

—Processing Example 3 (Clipping of Face Region of Person)—

Figure 22:
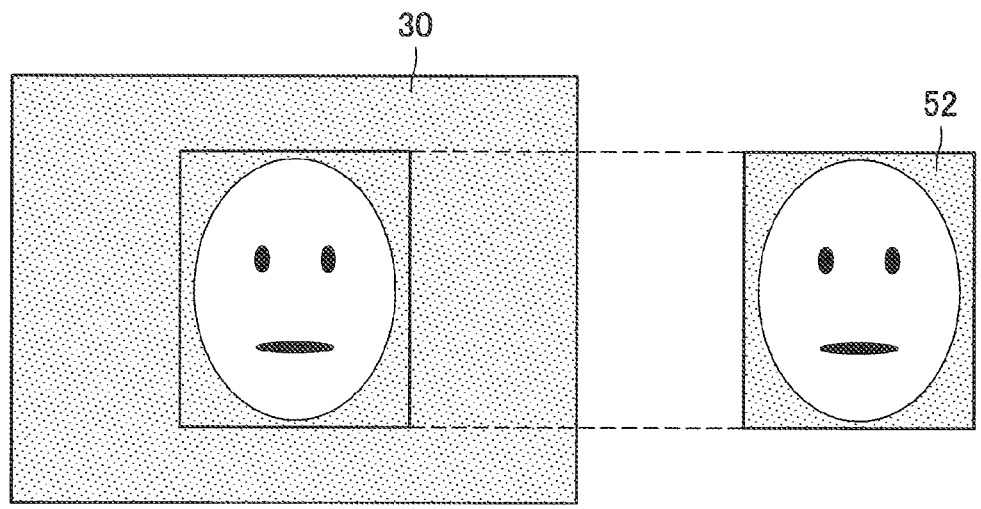
FIG. 22 is a diagram for describing an example of image processing by the image processing unit 110 according to the second embodiment.
Figure 23:
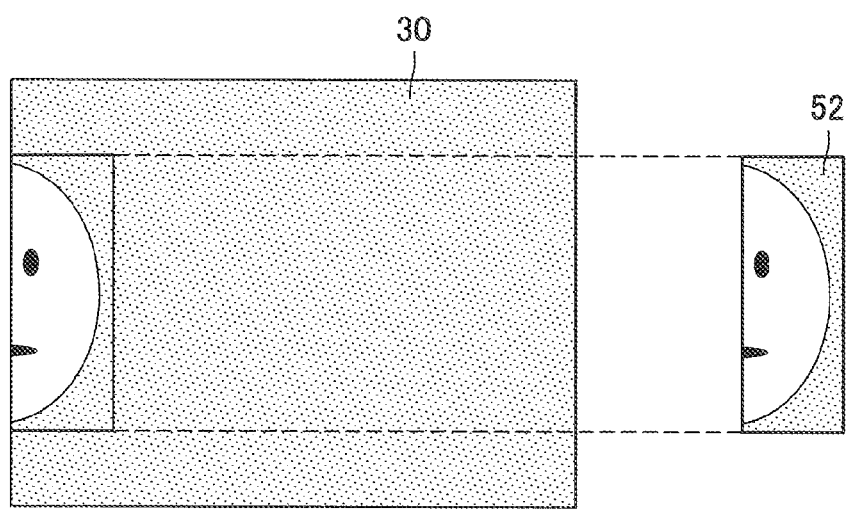
FIG. 23 is a diagram for describing an example of image processing by the image processing unit 110 according to the second embodiment.

In addition, as processing example 3, as illustrated in FIG. 22 or 23, when a face region detection unit 112 described later detects a face region of a person contained in the photographed image, the image processing unit 110 can generate an image obtained by clipping the detected face region from the photographed image.

As illustrated in FIG. 22, when the face region detection unit 112 detects the entire region of the face of a person, the image processing unit 110 may generate an image obtained by clipping the detected entire region of the face from the photographed image. In addition, as illustrated in FIG. 23, when the face region detection unit 112 detects a partial region of the face of a person, the image processing unit 110 may generate an image obtained by clipping only the detected partial region of the face from the photographed image.

—Processing Example 4 (Correction of Blur)—

In addition, as a modification, if the blur determination unit 114 described later determines that the photographed image is blurred to be greater than or equal to a threshold, then the image processing unit 110 can also correct a blur contained in the photographed image based on the action state of the user recognized by the action recognition unit 102 during photographing. For example, when the action recognition unit 102 recognizes that a user is in walking state during photographing, the image processing unit 110 may correct the photographed image using a program, which is previously stored in the storage device 162, for blur correction corresponding to a walking state.

In addition, when features of each action of the user are known previously, for example, by the information processing apparatus 10, the image processing unit 110 may correct the photographed image using a program, which is previously stored in the storage device 162, for blur correction corresponding to features of each action of the user.

In addition, the image processing unit 110 may correct a blur contained in the photographed image depending on the amount of change in movement or the amount of change in angle in three-dimensional space of the information processing apparatus 10, which is measured by the measurement unit 122 during photographing.

(3-2-1-3. Face Region Detection Unit 112)

The face region detection unit 112 is able to detect a face region of a person contained in the photographed image. For example, the face region detection unit 112 detects a face region of a person by extracting feature points such as eye, nose, or facial contour in the photographed image.

(3-2-1-4. Blur Determination Unit 114)

The blur determination unit 114 determines whether the photographed image is blurred to be greater than or equal to a threshold. For example, the blur determination unit 114 determines whether the photographed image is blurred to be greater than or equal to a threshold depending on the magnitude of the angle fluctuations measured by the gyroscope 172 during photographing. The threshold may be a value that is set by, for example, a designer or user of the information processing apparatus 10.

The functions of other components are similar to those of the first embodiment, and thus the description thereof is omitted here.

[3-2-2. Operation]

The configuration according to the second embodiment has been described above. Next, the operation according to the second embodiment is described.

FIG. 24 is a sequence diagram illustrating the operation according to the second embodiment. The operations of steps S201 to S205 are similar to those according to the first embodiment illustrated in FIG. 11, and thus the description thereof is omitted.

After step S205, the transmission control unit 107 determines whether the image photographed in S205 is transmitted to the server 20 (S206). For example, if the blur determination unit 114 determines that the photographed image is blurred to be greater than or equal to a threshold, then the transmission control unit 107 determines that the photographed image is not transmitted to the server 20 (S206: NO). On the other hand, if the blur determination unit 114 determines that the photographed image is blurred to be less than a threshold, then the transmission control unit 107 determines that the photographed image is transmitted to the server 20 (S206: YES).

Then, if it is determined that the photographed image is not transmitted to the server 20 (S206: NO), the information processing apparatus 10 performs the operation of S201 again.

On the other hand, if it is determined that the photographed image is transmitted to the server 20 (S206: YES), then the image processing unit 110 generates an image that is obtained by reducing the amount of information from the photographed image using a way corresponding to the action state of the user that is recognized by the action recognition unit 102 during photographing by the photographing unit 124 (S207). For example, if the face region detection unit 112 detects a face region of a person in the photographed image, then the image processing unit 110 generates an image, which is obtained by clipping the detected face region, from the photographed image.

Subsequently, the transmission control unit 107 allows the communication unit 120 to transmit the image generated or processed in step S207 to the server 20 (S208).

The operations subsequent to step S208 are substantially similar to those of steps S108 to 111 of the first embodiment illustrated in FIG. 11, and thus a description thereof is omitted.

[3-2-3. Advantages]

In the above, as described, for example, with reference to FIGS. 12, 24, and other illustrations, the information processing apparatus 10 according to the second embodiment recognizes an action state of the user based on the measurement results obtained by the measurement unit 122. Then, the information processing apparatus 10 perform the process regarding the amount of information on the image photographed by the photographing unit 124 based on the action state of the user recognized during photographing by the photographing unit 124. Then, the information processing apparatus 10 causes the processed image to be transmitted to the server 20. Thus, information processing apparatus 10 can reduce adaptively the communication traffic in transmitting the processed image to the server 20.

For example, when the information processing apparatus 10 recognizes an action in which a user is looking around during photographing, the information processing apparatus 10 compresses the resolution of the photographed image and transmits the image having compressed resolution to the server 20. Alternatively, when the information processing apparatus 10 recognizes an action in which a user is watching during photographing, the information processing apparatus 10 clips the region that is estimated as being watched by the user and transmits the clipped region to the server 20. Thus, it is possible to reduce the amount of information using an appropriate way depending on the action state of the user during photographing, thereby reducing adaptively the communication traffic.

In addition, if the photographed image is blurred to be greater than or equal to a threshold, then the information processing apparatus 10 may be unable to transmit the image to the server 20. In this way, the information processing apparatus 10 does not transmit an image, which is difficult to perform appropriate image recognition by the server 20, to the server 20, thereby reducing the communication traffic more efficiently.

Furthermore, basically, the information processing apparatus 10 performs only detection processing on whether the photographed image contains a face region of a person, and if a face region is detected, then the information processing apparatus 10 transmits an image of the detected face region to the server 20. The information processing apparatus 10 allows the server 20 to specify a person corresponding to the detected face region and receives the specified result from the server 20. Thus, the information processing apparatus 10 can reduce the amount of calculation necessary to specify a person contained in the photographed image, resulting in reduced power consumption.

<<3. Modification>>

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the information processing apparatus 10 according to each embodiment is not limited to a device provided with a glasses-type display as illustrated in FIG. 1. The information processing apparatus 10 may be configured as a wristwatch type device, a device that is worn on the user's neck such as a neck strap, a device that is mounted on the clothing of the user such as a wearable badge, or a device that is attached to the body of the user such as a headphone.

Furthermore, in the above, there has been described the example in which the information processing apparatus 10 is configured to include, for example, all of various types of sensors such as the position information measuring device 168 and the acceleration sensor 170, but an embodiment of the present disclosure is not limited thereto. Any one or more of the position information measuring device 168, the acceleration sensor 170, the gyroscope 172, and the microphone 174 may be provided in other portable devices that a user can carry. For example, when the acceleration sensor 170 is provided in another device that is attached near of the user's waist, the acceleration when the user is walking can advantageously be measured more accurately.

Moreover, according to one or more embodiments of the present disclosure, it is possible to provide a computer program used to allow hardware such as the CPU 150, the ROM 152, and the RAM 154 to execute a function equivalent to that of each component in the information processing apparatus 10 described above. In addition, a storage medium for storing the computer program is also provided.

Additionally, the present technology may also be configured as below.

(1) An information processing apparatus including:
an action recognition unit configured to recognize an action state of a user based on a measurement result obtained by a sensor carried by the user;
an image processing unit configured to perform a process regarding an amount of information on an image photographed by a photographing unit based on an action state of the user recognized by the action recognition unit during photographing by the photographing unit carried by the user; and
a transmission control unit configured to cause the image processed by the image processing unit to be transmitted to an image processing device used to perform image recognition.

(2) The information processing apparatus according to (1),
wherein the image processing unit generates an image obtained by reducing an amount of information from the photographed image using a way corresponding to an action state of the user recognized by the action recognition unit during photographing by the photographing unit, and
wherein the transmission control unit causes the image having the reduced amount of information to be transmitted to the image processing device.

(3) The information processing apparatus according to (1) or (2), wherein the action recognition unit recognizes an action state of the user based on a movement of a head of the user measured by the sensor.

(4) The information processing apparatus according to (3),
wherein the action state of the user includes a vision-related state of the user,
wherein the action recognition unit recognizes that the user is looking around when the sensor measures that a movement of the user's head is within a predetermined range, and
wherein the image processing unit generates an image obtained by reducing resolution from the photographed image when a state in which the user is looking around is recognized.

(5) The information processing apparatus according to (3) or (4),
wherein the action recognition unit recognizes that the user is watching when the sensor measures that a speed of movement of the head of the user is reduced to be less than or equal to a predetermined value, and
wherein the image processing unit generates an image obtained by clipping a predetermined region from the photographed image when a state in which the user is watching is recognized.

(6) The information processing apparatus according to any one of (3) to (5),
wherein the action state of the user includes a movement state of the user, and
wherein the image processing unit generates an image obtained by clipping a predetermined region from the photographed image when a state in which the user is moving during photographing by the photographing unit is recognized.

(7) The information processing apparatus according to (5) or (6), wherein the predetermined region is a peripheral region at a predetermined distance or more away from a center in the photographed image.

(8) The information processing apparatus according to (5) or (6), wherein the predetermined region is a region within a predetermined distance from a center in the photographed image.

(9) The information processing apparatus according to any one of (1) to (4), further including:
a face region detection unit configured to detect a face region of a person contained in the photographed image,
wherein the image processing unit clips a face region detected by the face region detection unit from the photographed image, and
wherein the transmission control unit causes an image of the face region clipped by the image processing unit to be transmitted to the image processing device.

(10) The information processing apparatus according to (3) or (4),
wherein the action recognition unit recognizes that the user is looking down using the sensor,
wherein the image processing unit clips a region from the photographed image such that the region to be clipped is within a predetermined distance from a lower end of the photographed image when a state in which the user is looking down is recognized, and
wherein the transmission unit causes an image of the region clipped by the image processing unit to be transmitted to the image processing device.

(11) The information processing apparatus according to (3) or (4),
wherein the action recognition unit recognizes that the user is looking upward using the sensor,
wherein the image processing unit clips a region from the photographed image such that the region to be clipped is within a predetermined distance from an upper end of the photographed image when a state in which the user is looking upward is recognized, and
wherein the transmission unit causes an image of the region clipped by the image processing unit to be transmitted to the image processing device.

(12) The information processing apparatus according to any one of (1) to (11), further including:
a blur determination unit configured to determine whether the photographed image is blurred to be greater than or equal to a threshold,
wherein the transmission control unit prevents the photographed image from being transmitted to the image processing device when the blur determination unit determines that the photographed image is blurred to be greater than or equal to the threshold.

(13) The information processing apparatus according to any one of (1) to (11), further including:
a blur determination unit configured to determine whether the photographed image is blurred to be greater than or equal to a threshold,
wherein the image processing unit corrects a blur contained in the photographed image based on an action state of the user recognized by the action recognition unit when the blur determination unit determines that the photographed image is blurred to be greater than or equal to the threshold.

(14) An information processing method including:
recognizing an action state of a user based on a measurement result obtained by a sensor carried by the user;
performing, by a processor, a process regarding an amount of information on an image photographed by a photographing unit based on an action state of the user recognized during photographing by the photographing unit carried by the user; and
causing the processed image to be transmitted to an image processing device used to perform image recognition.

(15) A program for causing a computer to function as:
an action recognition unit configured to recognize an action state of a user based on a measurement result obtained by a sensor carried by the user;
an image processing unit configured to perform a process regarding an amount of information on an image photographed by a photographing unit based on an action state of the user recognized by the action recognition unit during photographing by the photographing unit carried by the user; and
a transmission control unit configured to cause the image processed by the image processing unit to be transmitted to an image processing device used to perform image recognition.

What is claimed is:

1. An information processing apparatus comprising:
a Central Processing Unit (CPU) configured to:
recognize an action state of a user based on a measurement result obtained by a sensor carried by the user;
perform a process regarding an amount of information on an image photographed by a camera based on the action state of the user recognized during photographing by the camera carried by the user; and
cause the image, after the process, to be transmitted to a server used to perform image recognition,
wherein the image, after the process, is obtained by clipping a predetermined region from the photographed image in an event a state in which the user is watching is recognized, and
wherein the predetermined region is a region within a predetermined distance from a center in the photographed image.

2. The information processing apparatus according to claim 1, wherein the CPU is configured to:
generate an image obtained by reducing an amount of information from the photographed image using a way corresponding to the action state of the user recognized during photographing by the camera, and
cause the image having the reduced amount of information to be transmitted to the server.

3. The information processing apparatus according to claim 1, wherein the CPU is configured to recognize the action state of the user based on a movement of a head of the user measured by the sensor.

4. The information processing apparatus according to claim 3, wherein the CPU is configured to recognize that the user is watching in an event the sensor measures that a speed of movement of the head of the user is reduced to be less than or equal to a predetermined value.

5. The information processing apparatus according to claim 3,
wherein the action state of the user includes a movement state of the user, and
wherein the CPU is configured to generate an image obtained by clipping a predetermined region from the photographed image in an event a state in which the user is moving during photographing by the camera is recognized.

6. An information processing apparatus comprising:
a Central Processing Unit (CPU) configured to:
recognize an action state of a user based on a measurement result obtained by a sensor carried by the user;
perform a process regarding an amount of information on an image photographed by a camera based on the action state of the user recognized during photographing by the camera carried by the user;
cause the image, after the process, to be transmitted to a server used to perform image recognition;
recognize the action state of the user based on a movement of a head of the user measured by the sensor;
recognize that the user is looking down using the sensor;
clip a region from the photographed image such that the region to be clipped is within a predetermined distance from a lower end of the photographed image in an event a state in which the user is looking down is recognized; and
cause an image of the region to be transmitted to the server.

7. An information processing apparatus comprising:
a Central Processing Unit (CPU) configured to:
recognize an action state of a user based on a measurement result obtained by a sensor carried by the user;
perform a process regarding an amount of information on an image photographed by a camera based on the action state of the user recognized during photographing by the camera carried by the user;
cause the image, after the process, to be transmitted to an image processing device used to perform image recognition;
recognize the action state of the user based on a movement of a head of the user measured by the sensor;
recognize that the user is looking upward using the sensor; and
clip a region from the photographed image such that the region to be clipped is within a predetermined distance from an upper end of the photographed image in an event a state in which the user is looking upward is recognized; and
cause an image of the region to be transmitted to the server.

8. The information processing apparatus according to claim 1, wherein the CPU is configured to:
determine whether the photographed image is blurred to be greater than or equal to a threshold, and
prevent the photographed image from being transmitted to the server in an event the CPU determines that the photographed image is blurred to be greater than or equal to the threshold.

9. The information processing apparatus according to claim 1, wherein the CPU is configured to:
determine whether the photographed image is blurred to be greater than or equal to a threshold, and
correct a blur contained in the photographed image based on the action state of the user in an event the CPU determines that the photographed image is blurred to be greater than or equal to the threshold.

10. An information processing method comprising:
recognizing an action state of a user based on a measurement result obtained by a sensor carried by the user;
performing, by a processor, a process regarding an amount of information on an image photographed by a camera based on the action state of the user recognized during photographing by the camera carried by the user; and
causing the image, after the process, to be transmitted to a server used to perform image recognition,
wherein the image, after the process, is obtained by clipping a predetermined region from the photographed image in an event a state in which the user is watching is recognized, and wherein the predetermined region is a region within a predetermined distance from a center in the photographed image.

11. A non-transitory computer-readable storage medium, having stored thereon, a set of instructions for causing a computer to perform the steps comprising:
recognizing an action state of a user based on a measurement result obtained by a sensor carried by the user;
performing a process regarding an amount of information on an image photographed by a camera based on the action state of the user recognized during photographing by the camera carried by the user; and
causing the image, after the process, to be transmitted to a server used to perform image recognition,
wherein the image, after the process, is obtained by clipping a predetermined region from the photographed image in an event a state in which the user is watching is recognized, and
wherein the predetermined region is a region within a predetermined distance from a center in the photographed image.

\* \* \* \* \*